(12) United States Patent
Qian

(10) Patent No.: US 11,387,065 B2
(45) Date of Patent: Jul. 12, 2022

(54) LEAKAGE PROTECTOR

(71) Applicant: YuYao Electronic & Electric Appliance Co., Ltd, Zhejiang (CN)

(72) Inventor: Jiacan Qian, Zhejiang (CN)

(73) Assignee: YUYAO JIARONG ELECTRICAL APPLIANCE CO., LTD, Zhejiang (CN)

(*) Notice: Subject to any disclaimer, the term of this patent is extended or adjusted under 35 U.S.C. 154(b) by 422 days.

(21) Appl. No.: 16/690,154

(22) Filed: Nov. 21, 2019

(65) Prior Publication Data

US 2020/0203107 A1  Jun. 25, 2020

(30) Foreign Application Priority Data

Nov. 22, 2018 (CN) .......................... 201811396201.2
Nov. 22, 2018 (CN) .......................... 201811396390.3

(51) Int. Cl.
  *H01H 71/00* (2006.01)
  *H01H 71/10* (2006.01)
  *H01H 71/50* (2006.01)
  *H02H 3/02* (2006.01)
  *H02H 3/04* (2006.01)

(52) U.S. Cl.
  CPC ...... *H01H 71/1054* (2013.01); *H01H 71/505* (2013.01); *H02H 3/021* (2013.01); *H02H 3/04* (2013.01)

(58) Field of Classification Search
  CPC .. H01H 71/1054; H01H 71/505; H01H 83/14; H02H 3/021; H02H 3/04
  See application file for complete search history.

(56) References Cited

U.S. PATENT DOCUMENTS

2012/0081819 A1* 4/2012 Huang ..................... H02H 3/16
                                                            361/42
2018/0061605 A1* 3/2018 Huang ................. H01R 13/652

* cited by examiner

*Primary Examiner* — Adolf D Berhane
*Assistant Examiner* — Afework S Demisse
(74) *Attorney, Agent, or Firm* — Gang Yu

(57) ABSTRACT

The present disclosure discloses a leakage protector, and relates to the technical field of electrical apparatus protection. The leakage protector includes a protector device, pins, a bottom plate and a elastic sheet. The protector device includes a communication maintaining device, a communication device and a locking device. The locking device includes an elastic sheet pressing block and a locking deflector rod. The locking device includes a latch, a movable pressing plate and a hasp slide way, the latch, the movable pressing plate and the hasp slide way is provided on the locking deflector rod. The locking device includes a pressing rod, a hasp and a vertical fork groove, the pressing rod, the hasp and the vertical fork groove is provided on the elastic sheet pressing block.

28 Claims, 14 Drawing Sheets

LEAKAGE PROTECTOR

TECHNICAL FIELD

The present disclosure relates to a technical field of electrical apparatus protection, and particularly relates to a leakage protector.

BACKGROUND

A leakage protector can switch off a main line in time when an apparatus has a leakage fault or people needs to be protected from a dangerous electric shock, so that the leakage protector is widely applied. The application technology of the leakage protector is very mature. In terms of protection principles, the leakage protector can be categorized into a voltage type leakage protector and a current type leakage protector. In terms of mechanical structures, the leakage protector can be categorized into a self-locking type leakage protector and a suction type leakage protector. The commonly used leakage protector is a current type or voltage type leakage protector in a mechanical self-locking structure. The major characteristics of the mechanical self-locking structure are as follows: when the power supply of the leakage protector in operation is interrupted or a power supply circuit is out of phase and a line is in poor contact, the mechanical self-locking structure of the leakage protector in a switched-on state can not actively disconnect closing contacts; and at this time, if the power supply circuit is abnormally out of phase and an earth wire is abnormally charged or leaking, the leakage protector will lose the protection effect, resulting in safety accidents.

SUMMARY

Some embodiments of the present disclosure designs a self-release type mechanical structure, and a coil is adopted to continuously supply power to attract the release mechanism. When the power supply is interrupted, the contact is poor or the phase is missing, suction maintaining circuit of the mechanical structure can not generate a magnetic force for attracting the self-release mechanism due to the loss of voltage, which causes switching-off of a release circuit and disconnection of the closing contacts, thereby forming active protection and eliminating potential safety hazards.

Some embodiments of the present disclosure provide a leakage protector for solving the problem that the leakage protector can be switched off only under the condition of energization in the existing leakage protector, and simultaneously solving the problems that the existing leakage protector is easy to wear and that the service life is not long.

An embodiment of the present invention provides a leakage protector, including a protector device, pins, a bottom plate and a elastic sheet, wherein the protector device is disposed at an upper part of the bottom plate, the protector device controls switching-off and switching-on of the leakage protector, and the pins are disposed at a lower part of the bottom plate;

the protector device includes a communication maintaining device, a communication device and a locking device, and the locking device is disposed between the communication maintaining device and the communication device and is configured to control disconnection and connection of the elastic sheet and the pins;

the locking device includes an elastic sheet pressing block and a locking deflector rod, the locking deflector rod is movably hinged with a second support disposed on the communication device by a second pin shaft, and the elastic sheet pressing block is movably hinged with a first support disposed in a middle position of the bottom plate by a first pin shaft; wherein the locking device includes a latch, a movable pressing plate and a hasp slide way provided on the locking deflector rod and a hasp, a vertical fork groove and a pressing rod provided on the elastic sheet pressing block, and the hasp is configured to abut against the latch; the communication device includes a second iron core extending transversely, and the second iron core is in clamping fit with the vertical fork groove; the communication maintaining device includes a first iron core disposed longitudinally, and the first iron core in an energized state is configured to be in magnetic adsorption fit with the movable pressing plate;

when a power source is switched on, the second iron core drives the elastic sheet pressing block to rotate by the vertical fork groove, so that the pressing rod positioned at a bottom of the elastic sheet pressing block presses the elastic sheet downward, and meanwhile, the hasp slides upward along the hasp slide way; furthermore, in a process that the hasp slides to abut against the latch, the movable pressing plate continuously moves downward, and the movable pressing plate is adsorbed and fixed by the first iron core; the communication maintaining device is configured to fix a position of the locking deflector rod to enable the elastic sheet pressing block to be maintained in a pressed state and enable the elastic sheet and the pins to be maintained in a connected state, thereby realizing circuit switching-on; and when the power source is switched off, the communication maintaining device stops working, the locking deflector rod is released, and the latch is disengaged from the hasp to enable the elastic sheet to be disconnected from the pins, thereby realizing circuit switching-off.

In an exemplary embodiment, the elastic sheet include a first elastic sheet, a second elastic sheet and a PE wire elastic sheet, the first elastic sheet and the second elastic sheet are respectively fixed by elastic sheet slots disposed at two sides of the communication maintaining device, and the PE wire elastic sheet passes through a bottom of the communication maintaining device and is clamped and fixed with the communication maintaining device by the bottom plate.

Tops of the pins are provided with electrical connection contacts, and ends of the first elastic sheet, the second elastic sheet and the PE wire elastic sheet are provided with elastic sheet contacts corresponding to the electrical connection contacts; and when the pressing rod presses the elastic sheet downward, the elastic sheet contacts are in contact with the electrical connection contacts respectively, and the elastic sheet contacts on the first elastic sheet; in an using process, each of the second elastic sheet and the PE wire elastic sheet is provided with a disconnected state for disconnecting from the electrical connection contact and a connected state for connecting with the electrical connection contact.

In an exemplary embodiment, the leakage protector includes a plurality of buckle feet which are wedge-shaped, the plurality of buckle feet are provided on bottoms of the communication maintaining device and the communication device respectively, and the communication maintaining device and the communication device are fastened and fixed with the bottom plate respectively by the plurality of buckle feet.

In an exemplary embodiment, the communication device also includes a communication coil and a communication spring, the communication coil is fixed inside the communication device, and the communication spring and the second iron core are horizontally disposed in an inner cavity of the communication coil.

In an exemplary embodiment, the communication maintaining device further includes a maintaining coil, the maintaining coil is fixed inside the communication maintaining device, and the first iron core is vertically fixed in an inner cavity of the maintaining coil; and one end of the first iron core is fixedly connected with a bottom of the communication maintaining device, and the other end of the first iron core is configured to adsorb the movable pressing plate.

In an exemplary embodiment, the second pin shaft includes a sleeve part and a rotating shaft center, the sleeve part is disposed on the locking deflector rod, the rotating shaft center is disposed on the second support, the sleeve part is sleeved outside the rotating shaft center, and the locking deflector rod is capable of rotating around the rotating shaft center through the sleeve part.

In an exemplary embodiment, the leakage protector further comprises a pressing top block provided on the locking deflector rod, and the pressing top block is positioned at one side of the latch; and when the power source is switched on, the second iron core drives the elastic sheet pressing block to rotate by the vertical fork groove, the hasp slides upward along the hasp slide way, and the hasp instantly abuts against the pressing top block after sliding through the latch, so that the movable pressing plate moves downward to be adsorbed and fixed by the first iron core.

In an exemplary embodiment, the leakage protector further comprises an indicating block (42) provided on the locking deflector rod, and the indicating block is positioned at an upper part of the locking deflector rod; when the power source is switched on, the indicating block moves into an observation window of a protector housing; when the power source is switched off, the indicating block is removed from the observation window of the protector housing; and the indicating block is red.

In an exemplary embodiment, the leakage protector comprises a limiting baffle provided on the locking deflector rod, and the limiting baffle is disposed at an end of the locking deflector rod and is positioned at an upper part of the second support; and when the power source is switched off, the limiting baffle abuts against the second support so as to limit a rotation angle of the locking deflector rod.

In an exemplary embodiment, the elastic sheet include a first elastic sheet and a second elastic sheet, and the first elastic sheet and the second elastic sheet are fixed by the elastic sheet slots disposed at two sides of the communication maintaining device respectively;

tops of the pins are provided with electrical connection contacts, and ends of the first elastic sheet and the second elastic sheet are provided with elastic sheet contacts corresponding to the electrical connection contacts; when the pressing rod presses the elastic sheet downward, the elastic sheet contacts are in contact with the electrical connection contacts; and in an using process, each of the elastic sheet contacts on the first elastic sheet and the second elastic sheet are provided with a disconnected state for disconnecting from the electrical connection contacts and a connected state for connecting with the electrical connection contact, and a PE wire can not be disconnected and is maintained in a connected state.

In an exemplary embodiment, the leakage protector comprises a bulge, wherein the bulge is disposed in a position, corresponding to the PE wire elastic sheet, of the pressing rod; when the pressing rod is pressed downward, the bulge enables the PE wire elastic sheet to be connected with the pins before the first elastic sheet and the second elastic sheet; and when the pressing rod is lifted, the bulge enables the PE wire elastic sheet to be disconnected from the pins after the first elastic sheet and the second elastic sheet.

In an exemplary embodiment, leakage protector further includes a pressing plate pin hole disposed on the locking deflector rod, and the movable pressing plate is matched and hinged with the pressing plate pin hole by a pin shaft.

The present disclosure provides another leakage protector, including a protector device, pins, a bottom plate and a elastic sheet, wherein the protector device is disposed at an upper part of the bottom plate, the protector device controls switching-off and switching-on of the leakage protector, and the pin is disposed at a lower part of the bottom plate;

the protector device includes a communication maintaining device, a communication device and a locking device, and the locking device is disposed between the communication maintaining device and the communication device and is configured to control disconnection and connection of the elastic sheet and the pins;

the locking device includes an elastic sheet pressing block and a locking deflector rod, the locking deflector rod is movably hinged with a second support disposed on the communication device by a second pin shaft, and the elastic sheet pressing block is movably hinged with a first support disposed in the middle position of the bottom plate through a first pin shaft; wherein the locking device includes a latch, a movable pressing plate and a hasp slide way, the latch, the movable pressing plate and the hasp slide way is provided on the locking deflector rod;

and a pressing block upper part and a pressing block lower part, the locking device includes a hasp, a vertical fork groove provided on the pressing block upper part, a pressing rod provided on the pressing block lower part and a pressing block spring, the pressing block upper part is hinged with the pressing block lower part by a first pin shaft, and pressing block spring in a compressed state is disposed between the pressing block upper part and the pressing block lower part; when the pressing rod abuts against the elastic sheet, an elasticity of the pressing block spring enables the pressing rod to maintain a stable action force against the elastic sheet, and the hasp is configured to abut against the latch;

the communication device includes a second iron core extending transversely, and the second iron core is in clamping fit with the vertical fork groove; the communication maintaining device includes a first iron core disposed longitudinally, and the first iron core is configured to be in magnetic adsorption fit with the movable pressing plate;

when a power source is switched on, the second iron core drives the elastic sheet pressing block to rotate by the vertical fork groove, so that the pressing rod positioned at a bottom of the elastic sheet pressing block presses the elastic sheet downward, and meanwhile, the hasp slides upward along the hasp slide way; furthermore, in a process that the hasp slides to abut against the latch, the movable pressing plate continuously moves downward, and the movable pressing plate is adsorbed and fixed by the first iron core; the communication maintaining device is configured to fix a position of the locking deflector rod to enable the elastic sheet pressing block to be maintained in a pressed state and enable the elastic sheet and the pins to be maintained in a connected state, thereby realizing circuit switching-on; and when the power source is switched off, the communication maintaining device stops working, the locking deflector rod is released, and the latch is disengaged from the hasp to enable the elastic sheet to be disconnected from the pins, thereby realizing circuit switching-off.

In an exemplary embodiment, the locking device includes a hinged seat disposed at a hinged portion of the pressing block upper part and the pressing block lower part, the first pin shaft penetrates through an inside of the hinged seat, the hinged seat is further provided with a limit stop, and the limit stop is configured to control an opening angle between the pressing block upper part and the pressing block lower part when the pressing block upper part and the pressing block lower part rotate by taking the first pin shaft as an axial center.

In an exemplary embodiment, the elastic sheet include a first elastic sheet, a second elastic sheet and a PE wire elastic sheet, the first elastic sheet and the second elastic sheet are respectively fixed by elastic sheet slots disposed at two sides of the communication maintaining device, and the PE wire elastic sheet passes through a bottom of the communication maintaining device and is clamped and fixed with the communication maintaining device by the bottom plate;

tops of the pins are provided with electrical connection contacts, and ends of the elastic sheet are provided with elastic sheet contacts corresponding to the electrical connection contacts; when the pressing rod presses the elastic sheet downward, the elastic sheet contacts are in contact with the electrical connection contacts respectively; and in an using process, each of the elastic sheet contacts on the first elastic sheet, the second elastic sheet and the PE wire elastic sheet is provided with a disconnected state for disconnecting from the electrical connection contact and a connected state for connecting with the electrical connection contact.

In an exemplary embodiment, the elastic sheet include a first elastic sheet and a second elastic sheet, and the first elastic sheet and the second elastic sheet are respectively fixed by elastic sheet slots disposed at two sides of the communication maintaining device;

tops of the pins are provided with electrical connection contacts, and ends of the first elastic sheet and the second elastic sheet are provided with elastic sheet contacts corresponding to the electrical connection contacts; when the pressing rod presses the elastic sheet downward, the elastic sheet contacts are in contact with the electrical connection contacts respectively; and in an using process, each of the elastic sheet contacts on the first elastic sheet and the second elastic sheet is provided with a disconnected state for disconnecting from the electrical connection contact and a connected state for connecting with the electrical connection contact, and a PE wire can not be disconnected and is maintained in a connected state.

In an exemplary embodiment, the leakage protector comprises a plurality of buckle feet which are wedge-shaped, the plurality of buckle feet are provided on bottoms of the communication maintaining device and the communication device respectively, and the communication maintaining device and the communication device are fastened and fixed with the bottom plate respectively by the plurality of buckle feet.

In an exemplary embodiment, the communication device further includes a communication coil and a communication spring, the communication coil is fixed inside the communication device, and the communication spring and the second iron core are horizontally disposed in an inner cavity of the communication coil in sequence.

In an exemplary embodiment, the communication maintaining device further includes a maintaining coil, the maintaining coil is fixed inside the communication maintaining device, and the first iron core is vertically fixed in an inner cavity of the maintaining coil; and one end of the first iron core is fixedly connected with a bottom of the communication maintaining device, and the other end of the first iron core is configured to adsorb the movable pressing plate.

In an exemplary embodiment, the second pin shaft includes a sleeve part and a rotating shaft center, the sleeve part is disposed on the locking deflector rod, the rotating shaft center is disposed on the second support, the sleeve part is sleeved outside the rotating shaft center, and the locking deflector rod is capable of rotating rotate around the rotating shaft center through the sleeve part.

In an exemplary embodiment, the locking device includes a pre-hinging device provided on the hinged seat, the pre-hinging device includes a lug boss and a clamping groove, the lug boss is positioned at the hinged portion of the pressing block upper part, the clamping groove is positioned at the hinged portion of the pressing block lower part, and pre-hinging of the pressing block upper part and the pressing block lower part is realized by a cooperation of the lug boss and the clamping groove.

In an exemplary embodiment, the locking device includes a pre-hinging device, the pre-hinging device is provided on the hinged seat, the pre-hinging device includes a lug boss and a clamping groove, the clamping groove is positioned at the hinged portion of the pressing block upper part, the lug boss is positioned at the hinged portion of the pressing block lower part, and pre-hinging of the pressing block upper part and the pressing block lower part is realized by the cooperation of the lug boss and the clamping groove.

In an exemplary embodiment, the leakage protector further includes a pressing top block, the pressing top block is provided on the locking deflector rod, and the pressing top block is positioned at one side of the latch; and when the power source is switched on, the second iron core drives the elastic sheet pressing block to rotate by the vertical fork groove, the hasp slides upward along the hasp slide way, and the hasp instantly abuts against the pressing top block after sliding through the latch, so that the movable pressing plate moves downward to be adsorbed and fixed by the first iron core.

In an exemplary embodiment, the leakage protector further includes an indicating block provided on the locking deflector rod, and the indicating block is positioned at an upper part of the locking deflector rod; when the power source is switched on, the indicating block moves into an observation window of a protector housing; when the power source is switched off, the indicating block is removed from the observation window of the protector housing; and the indicating block is red.

In an exemplary embodiment, the leakage protector comprises a limiting baffle provided on the locking deflector rod, and the limiting baffle is disposed at an end of the locking deflector rod and is positioned at an upper part of the second support; and when the power source is switched off, the limiting baffle abuts against the second support so as to limit a rotation angle of the locking deflector rod.

In an exemplary embodiment, the leakage protector includes a bulge, wherein the bulge is disposed in a position, corresponding to the PE wire elastic sheet, of the pressing rod; when the pressing rod is pressed downward, the bulge enables the PE wire elastic sheet to be connected with the pins before the first elastic sheet and the second elastic sheet; and when the pressing rod is lifted, the bulge enables the PE wire elastic sheet to be disconnected from the pins after the first elastic sheet and the second elastic sheet.

In an exemplary embodiment, leakage protector further includes a pressing plate pin hole disposed on the locking deflector rod, and the movable pressing plate is matched and hinged with the pressing plate pin hole by a pin shaft.

Compared with the related art, the leakage protector provided by the present disclosure has the advantages that under the condition that a maintaining coil is ineffective, the leakage protector is switched off by the cooperation relationship between mechanical structures, thereby greatly improving the safety in a using process; by the design of the hasp slide way, the reliability of the leakage protector provided by the present disclosure is stronger, and the safety performance is further enhanced;

In an exemplary embodiment, by the arrangement of the pressing top block, the hasp can push the movable pressing plate to rotate for an additional angle, so that it is easy for the first iron core to adsorb the movable pressing plate;

In an exemplary embodiment, by the limiting action of the limiting baffle, the limitation of the range of the rotation angle of the locking deflector rod is realized; by the design of the movable pressing plate, the service life of the leakage protector is greatly prolonged;

In an exemplary embodiment, the pressing block upper part and the pressing block lower part are connected by the pressing block springs to form the elastic sheet pressing block, so that the elastic sheet pressing block does not rely on the fixedly limited mechanical structures only in the process of pressing the elastic sheet; by adopting the pressing block springs, the pressing rod of the pressing block lower part can apply a stable pressing force to the elastic sheet; and on an exemplary embodiment, subsequently, after the mechanical wear is caused by the long-term use, the opening angle between the pressing block upper part and the pressing block lower part when the pressing block upper part and the pressing block lower part rotate relative to each other with the first pin shaft as an axial center can be increased by the elasticity of the pressing block springs, so that the pressing force of the pressing rod of the pressing block lower part to the elastic sheet is ensured, and the electrical connection in the leakage protector is stable and reliable.

In the figures: 1, protector housing; 2, protector device; 3, pin; 4, bottom plate; 5, elastic sheet; 6, communication maintaining device; 7, communication device; 8, locking device; 8a, elastic sheet pressing block; 8b, locking deflector rod; 8c, pressing block upper part; 8d, pressing block lower part; 9, pressing block spring; 10, buckle foot; 11, limiting baffle; 12, limit stop; 13, lug boss; 14, clamping groove; 15, observation window; 16, electrical connection contact; 21, first pin shaft; 22, pressing rod; 23, vertical fork groove; 24, hasp; 31, second pin shaft; 33, latch; 34, movable pressing plate; 35, pressing top block; 36, hasp slide way; 41, bulge; 42, indicating block; 43, first support; 51, elastic sheet contact; 52, first elastic sheet; 53, second elastic sheet; 54, PE wire elastic sheet; 55, elastic sheet slot; 56, metal plate; 61, maintaining coil; 62, first iron core; 63, pressing plate pin hole; 64, second support; 71, communication coil; 72, second iron core; 73, communication spring.

DETAILED DESCRIPTION OF THE EMBODIMENTS

The specific implementation modes of the present disclosure are further described in detail below with reference to the drawings and embodiments. The following embodiments are intended to illustrate the present disclosure but are not intended to limit the scope of the present disclosure.

Embodiment 1

Figure 1:
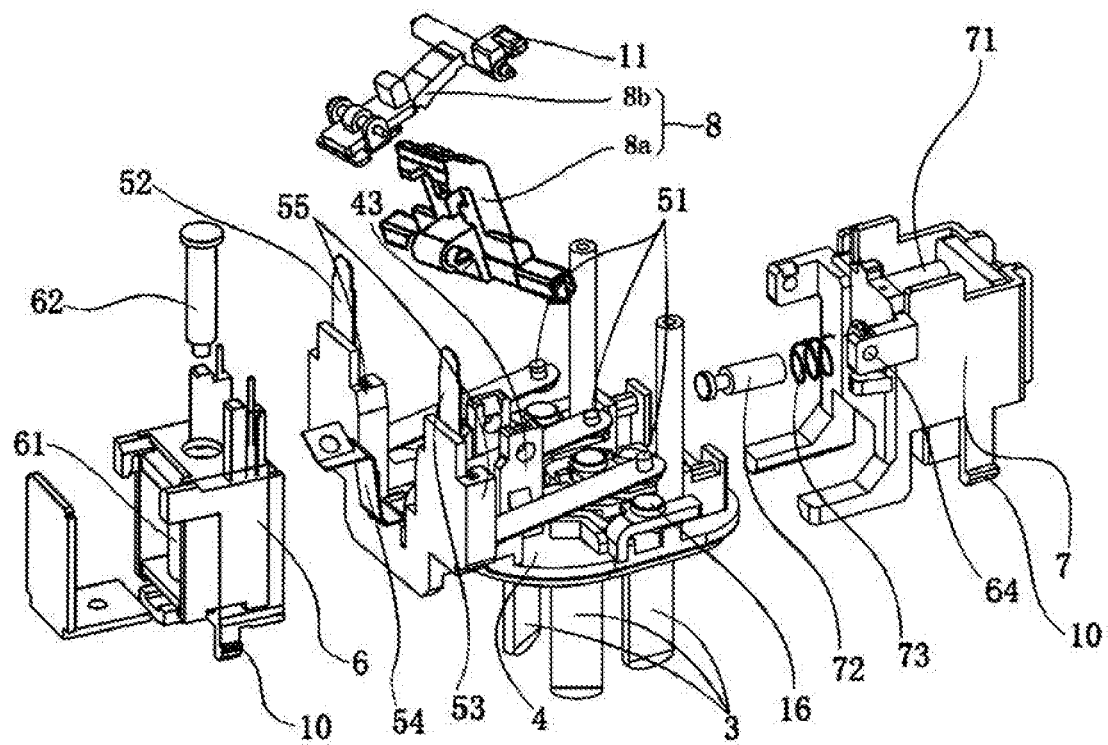
FIG. 1 illustrates one exploded diagram of a leakage protector according to an embodiment of the present disclosure.
Figure 2:
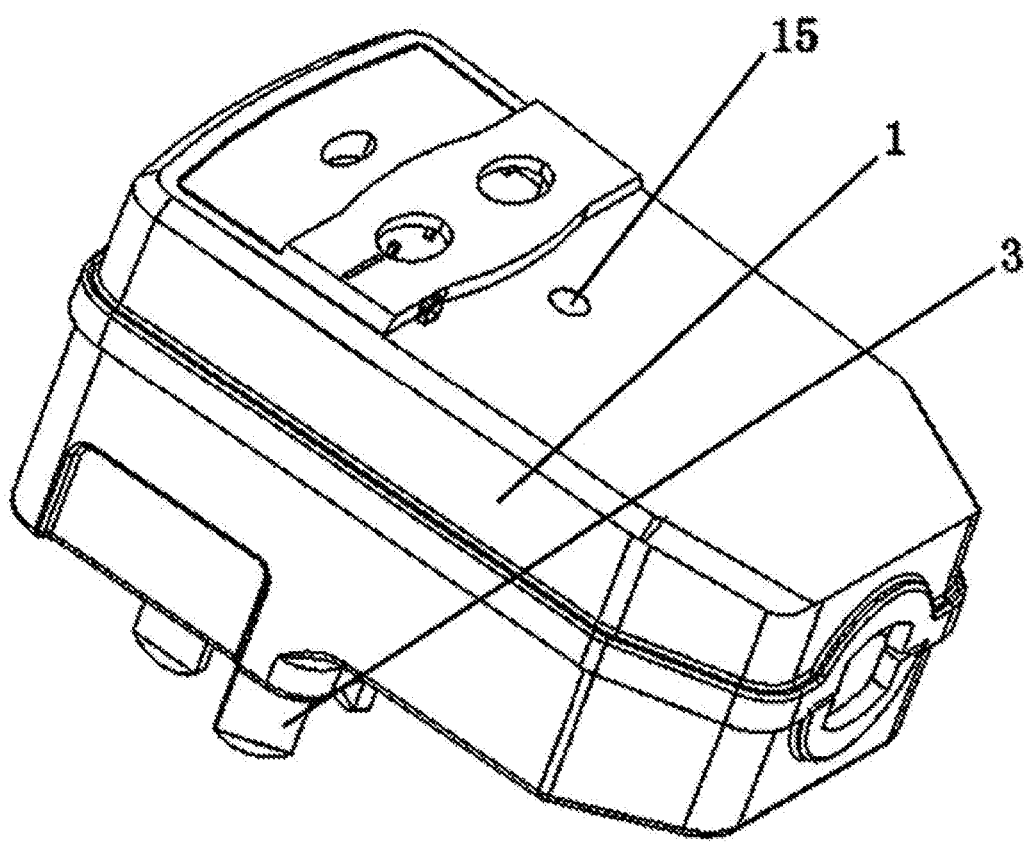
FIG. 2 illustrates a three-dimensional diagram of the leakage protector according to an embodiment of the present disclosure.

As shown in FIG. 1 and FIG. 2, a leakage protector according to an embodiment of the present disclosure includes a protector housing 1, a protector device 2, pins 3, a bottom plate 4 and a elastic sheet 5, wherein the protector device 2 is disposed at an upper part of the bottom plate 4, the protector device 2 controls switching-on and switching-off of the leakage protector, and the pins 3 are disposed at a lower part of the bottom plate 4;

the protector device 2 includes a communication maintaining device 6, a communication device 7 and a locking device 8, and the locking device 8 is disposed between the communication maintaining device 6 and the communication device 7 and is configured to control disconnection and connection of the elastic sheet 5 and the pins 3;

the locking device 8 includes an elastic sheet pressing block 8a and a locking deflector rod 8b, the locking deflector rod 8b is movably hinged with a second support 64 disposed on the communication device 7 by a second pin shaft 31, and the elastic sheet pressing block 8a is movably hinged with a first support 43 disposed in a middle position of the bottom plate 4 by a first pin shaft 21; wherein the locking device 8 comprises a latch 33, a movable pressing plate 34 and a hasp slide way 36 provided on the locking deflector rod 8b; and a hasp 24, a vertical fork groove 23 and a pressing rod 22 provided on the elastic sheet pressing block 8a, and the hasp 24 is configured to abut against the latch 33; according to different needs of users, the positions of the first support 43 and the second support 64 can be adjusted.

The communication device 7 includes a second iron core 72 extending transversely, and the second iron core 72 is in clamping fit with the vertical fork groove 23; and the communication maintaining device 6 is provided with a first iron core 62 disposed longitudinally, the first iron core 62 is fixed on the communication maintaining device 6, and the first iron core 62 is in adsorption fit with the movable pressing plate 34.

Figure 5:
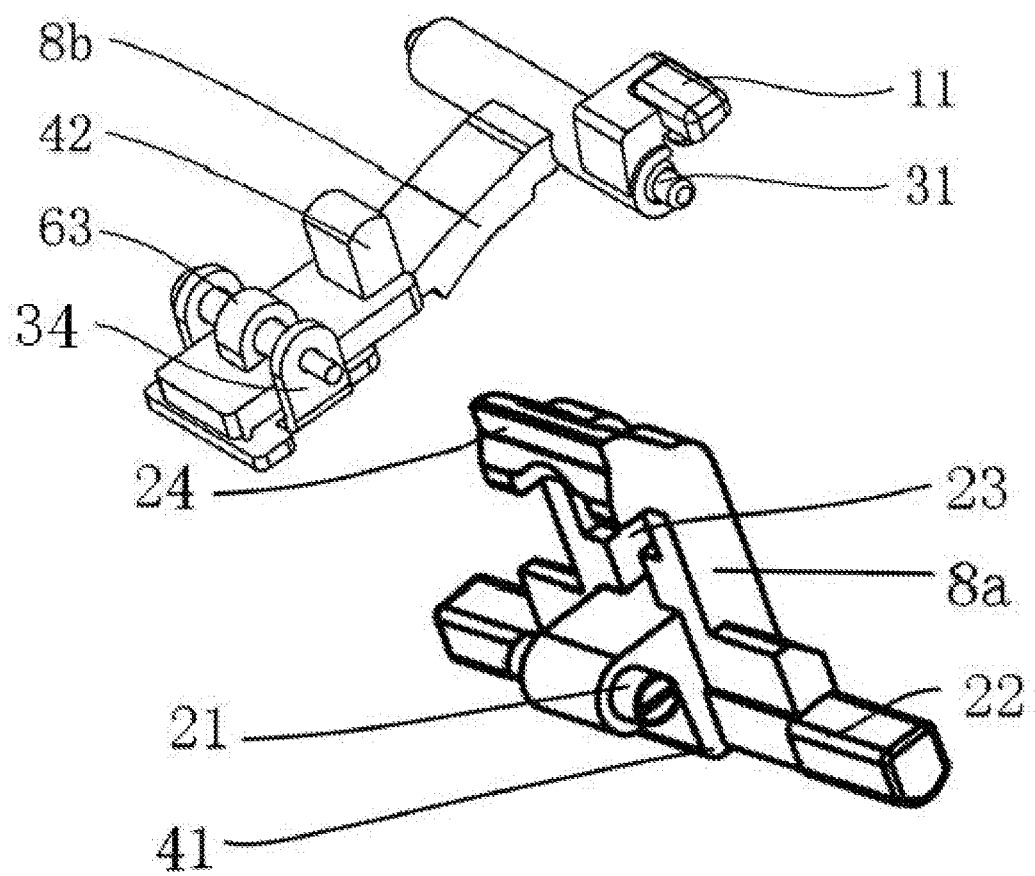
FIG. 5 illustrates one structural diagram of a locking device of the leakage protector according to an embodiment of the present disclosure.

As shown in FIG. 1 and FIG. 5, when the hasp 24 slides counterclockwise along the hasp slide way 36, the locking deflector rod 8b continuously rotates clockwise, thereby avoiding the condition of standstill or jump of the movable pressing plate 34 when the hasp 24 slides counterclockwise along the hasp slide way 36, wherein the standstill or jump will affect the speed of adsorption and fixation of the movable pressing plate 34 and the first iron core 62, and too low speed will cause communication failure of the leakage protector.

Figure 4:
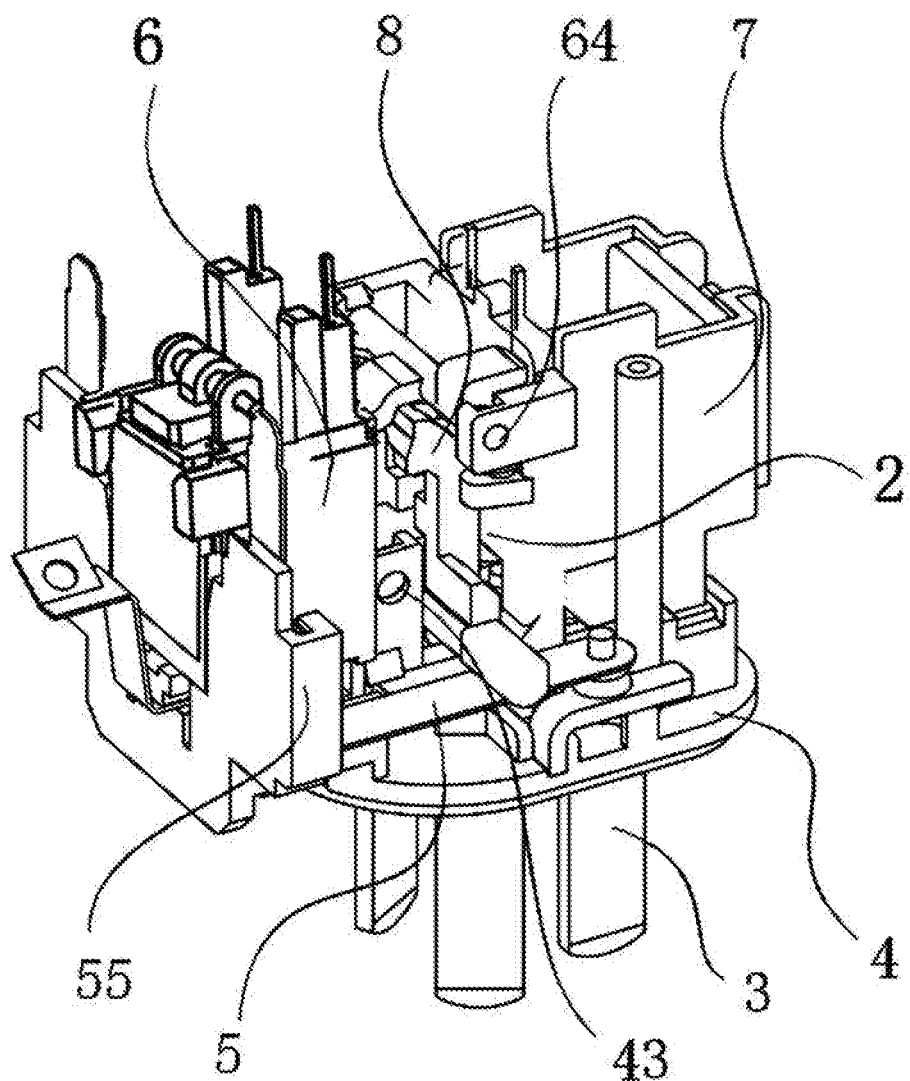
FIG. 4 illustrates one structural diagram of the leakage protector according to an embodiment of the present disclosure when the power source is in a switched-on state.

As shown in FIG. 1 and FIG. 4, when a power source is switched on, the second iron core 72 drives the elastic sheet pressing block 8a to rotate by the vertical fork groove 23, so that the pressing rod 22 positioned at a bottom of the elastic sheet pressing block 8a presses the elastic sheet 5 downward, and meanwhile, the hasp 24 slides upward along the hasp slide way 36; furthermore, in a process that the hasp 24 slides to abut against the latch 33, the movable pressing plate 34 is driven to continuously move downward; and the movable pressing plate 34 is adsorbed and fixed by the first iron core 62, and the communication maintaining device 6 is configured to fix a position of the locking deflector rod 8b so as to enable the elastic sheet pressing block 8a to be maintained in a pressed state and enable the elastic sheet 5 and the pins 3 to be maintained in a connected state, thereby realizing circuit switching-on.

Figure 3:
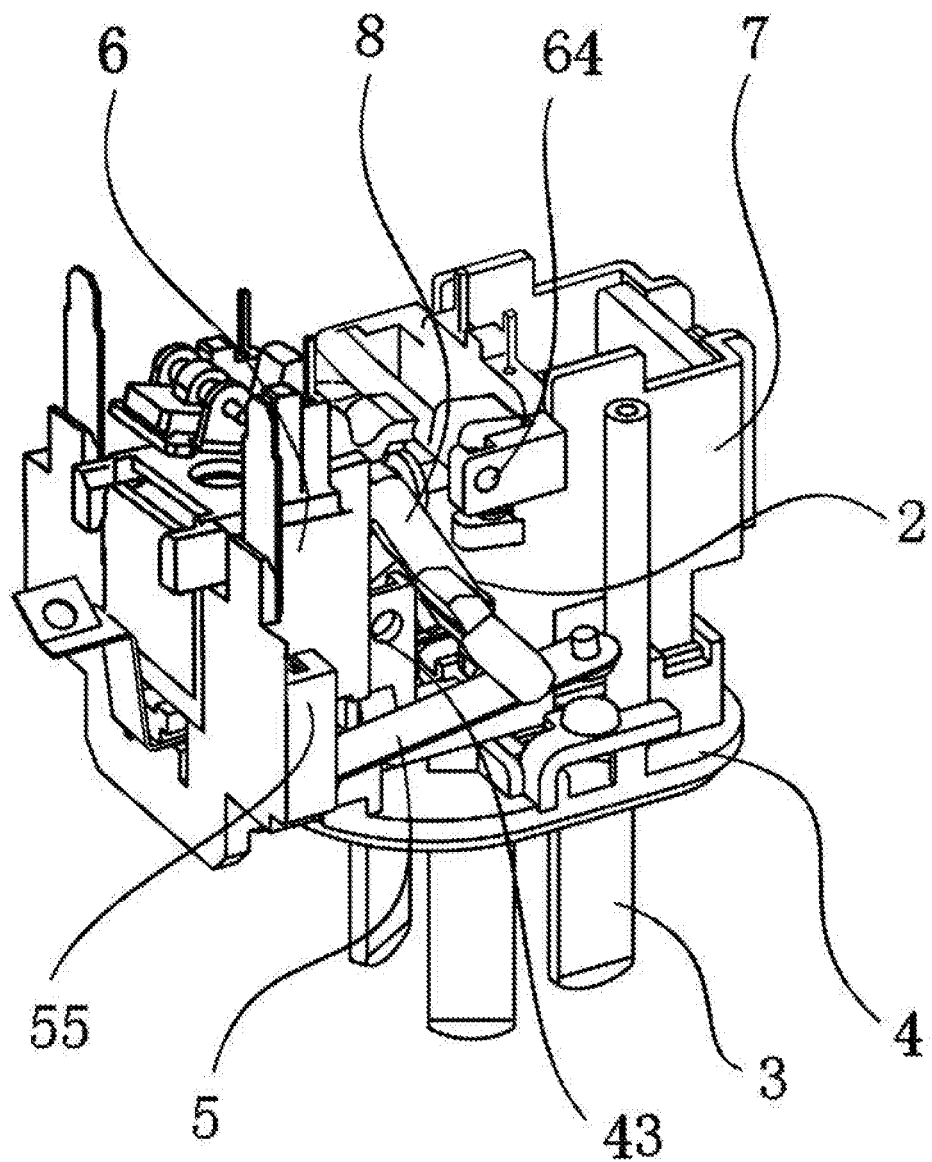
FIG. 3 illustrates one structural diagram of the leakage protector according to an embodiment of the present disclosure when a power source is in a switched-off state.

As shown in FIG. 1 and FIG. 3, when the power source is switched off, the communication maintaining device 6 stops working, the locking deflector rod 8b is released, and the latch 33 is disengaged from the hasp 24 to enable the elastic sheet 5 to be disconnected from the pins 3, thereby realizing circuit switching-off.

As shown in FIG. 1 and FIG. 2, the leakage protector further includes an indicating block 42 provided on the locking deflector rod 8b, and the indicating block 42 is positioned at an upper part of the locking deflector rod 8b; when the power source is switched on, the indicating block 42 moves into an observation window 15 of a protector housing 1; and when the power source is switched off, the indicating block 42 is removed from the observation window 15 of the protector housing 1. The indicating block 42 can well indicate the working state of the leakage protector. The red indicating block 42 is more conspicuous and has a good reminding effect.

As shown in FIG. 1, the elastic sheet 5 includes a first elastic sheet 52, a second elastic sheet 53 and a PE wire elastic sheet 54, the first elastic sheet 52 and the second elastic sheet 53 are respectively fixed by elastic sheet slots 55 disposed at two sides of the communication maintaining device 6, and the PE wire elastic sheet 54 passes through a bottom of the communication maintaining device 6 and is clamped and fixed with the communication maintaining device 6 by the bottom plate 4; three pins 3 of a zero wire, a live wire and a PE wire are disposed corresponding to the elastic sheet 5, tops of the pins 3 are provided with electrical connection contacts 16, and ends of the elastic sheet 5 is provided with elastic sheet contacts 51 corresponding to the electrical connection contacts 16; when the pressing rod 22 presses the elastic sheet 5 downward, the elastic sheet contacts 51 are in contact with the electrical connection contacts 16, thereby well ensuring the stability of circuit connection and avoiding circuit connection problems in a using process; in an using process, each of the elastic sheet contact 51 on the PE wire elastic sheet 54 is provided with a disconnected state for disconnecting from the electrical connection contact 16 on the pin 3 for connecting the PE wire and a connected state for connecting with the electrical connection contact 16; and the first elastic sheet 52 is a live wire elastic sheet, the second elastic sheet 53 is a zero wire elastic sheet, and the PE wire elastic sheet 54 is an earth wire elastic sheet.

As shown in FIG. 1, the leakage protector comprises a plurality of buckle feet 10 which are wedge-shaped, the plurality of buckle feet 10 are provided on bottoms of the communication maintaining device 6 and the communication device 7 respectively, and the communication maintaining device 6 and the communication device 7 are fastened and fixed with the bottom plate 4 respectively by the plurality of buckle feet 10. The installation is simple, convenient, firm and reliable, and a mold is used for die sinking directly, thereby reducing the production cost.

As shown in FIG. 1, the communication device 7 further includes a communication coil 71 and a communication spring 73, the communication coil 71 is fixed inside the communication device 7, and the communication spring 73 and the second iron core 72 are horizontally disposed in an inner cavity of the communication coil 71 in sequence; when the power source is switched off, the second iron core 72 is pushed out and enables the elastic sheet pressing block 8a to rotate clockwise through the elasticity of the communication spring 73, and at this time, the elasticity of the elastic sheet 5 further enables the elastic sheet pressing block 8a to rotate clockwise, so that the pressing rod 22 is lifted and the elastic sheet 5 are released; and when the power source is switched on, the communication coil 71 is electrified, so that the second iron core 72 is clamped with the vertical fork groove 23 to drive the elastic sheet pressing block 8a to rotate counterclockwise.

Figure 15:
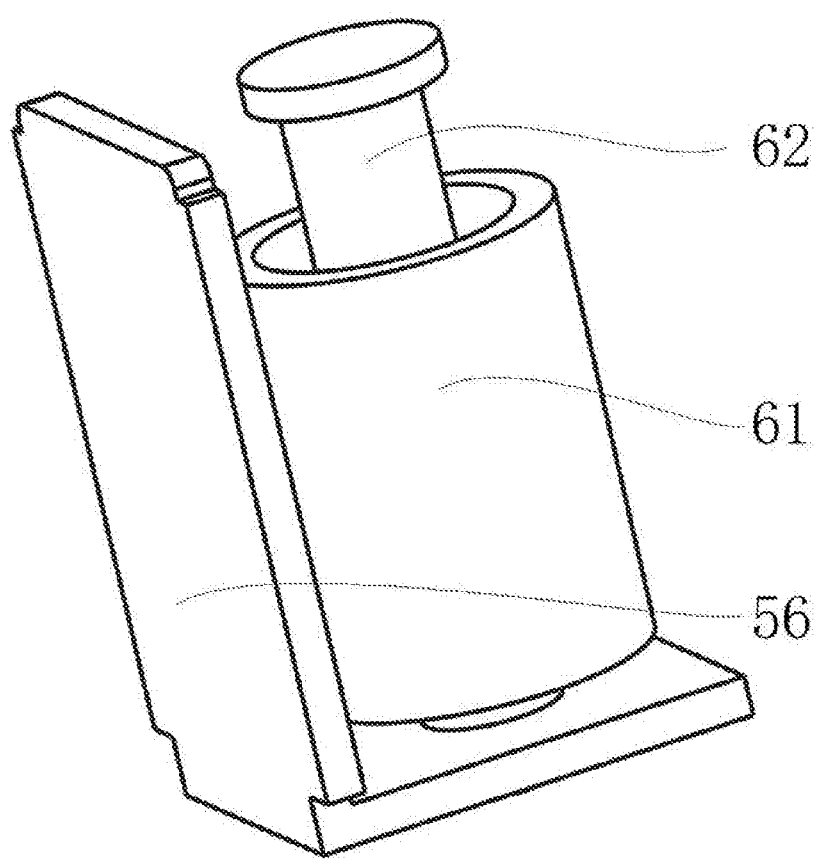
FIG. 15 illustrates an internal structural diagram of a communication maintaining device of the leakage protector of the present disclosure.

As shown in FIG. 1, the communication maintaining device 6 further includes a maintaining coil 61, the maintaining coil 61 is fixed inside the communication maintaining device 6, and the first iron core 62 is vertically disposed in an inner cavity of the maintaining coil 61; one end of the first iron core 62 is fixedly connected with a bottom of the communication maintaining device 6, and the other end of the first iron core 62 is configured to adsorb the movable pressing plate 34; when the power source is switched on, the maintaining coil 61 is electrified, and the movable pressing plate 34 is adsorbed by the first iron core 62, so that the hasp 24 abuts against the latch 33, and the leakage protector is in a switched-on state; and when the power source is switched off, the maintaining coil 61 is powered off, the movable pressing plate 34 is released, the latch 33 is disengaged from the hasp 24, and the elastic sheet 5 is disconnected from the pin 3, thereby realizing circuit switching-off. As shown in FIG. 15, a metal plate 56 is disposed in the communication maintaining device 6, the metal plate 56 is of L-shaped, and one end of the first iron core 62 is fixed at a bottom of the metal plate 56; and when the movable pressing plate 34 is adsorbed by the communication maintaining device 6, the movable pressing plate 34 simultaneously abuts against the first iron core 62 and a side plate of the L-shaped metal plate 56, thereby ensuring that the movable pressing plate 34 is stably adsorbed and fixed by the communication maintaining device 6.

As shown in FIG. 5, the leakage protector comprises a bulge 41, wherein the bulge 41 is disposed in a position, corresponding to the PE wire elastic sheet 54, of the pressing rod 22; that is, the bulge 41 on the pressing rod 22 is in direct contact with the PE wire elastic sheet 54; when the pressing rod 22 is pressed downward, the bulge 41 enables the PE wire elastic sheet 54 to be connected with the pins 3 before the first elastic sheet 52 and the second elastic sheet 53; and when the pressing rod 22 is lifted, the bulge 41 enables the PE wire elastic sheet 54 to be disconnected from the pins 3 after the first elastic sheet 52 and the second elastic sheet 53. In an exemplary embodiment, when the power source is switched on, firstly, the PE wire elastic sheet 54 is connected with a first pin of the pins 3, and then, the first elastic sheet 52 and the second elastic sheet 53 are connected with a second and third pins of the pins 3 respectively; and when the power source is switched off, firstly, the first elastic sheet 52 and the second elastic sheet 53 are disconnected from the second and third pins of the pins 3, and then, the PE wire elastic sheet 54 is disconnected from the first pin of the pins 3.

When the elastic sheet 5 is pressed, the bulge 41 at a top of the PE wire elastic sheet 54 is in contact with the PE wire elastic sheet 54 firstly to enable the elastic sheet contact 51 on the PE wire elastic sheet 54 to be in contact with the electrical connection contact 16 on the pin 3 for connecting the PE wire firstly, and then, the elastic sheet contact 51 on the live wire elastic sheet and the elastic sheet contact 51 on the zero wire elastic sheet are in contact with the electrical connection contacts 16 on the pins 3, so that in the process of circuit switching-on, firstly, the earth wire is in contact connection, and then, the zero wire and the live wire are in contact connection.

When the elastic sheet 5 is reset and move upward, firstly, the elastic sheet contact 51 on the live wire elastic sheet and the elastic sheet contact 51 on the zero wire elastic sheet are separated from the electrical connection contacts 16 on the pins 3, and then, the elastic sheet contact 51 on the PE wire elastic sheet 54 is separated from the electrical connection contact 16 on the pin 3 for connecting the PE wire, so that in the switching-off work, firstly, the zero wire and the live wire are separated, and then, the earth wire is separated.

In an exemplary embodiment, as shown in FIG. 5, the second pin shaft 31 includes a sleeve part and a rotating shaft center, the sleeve part is disposed on the locking deflector rod 8b, the rotating shaft center is disposed on the second support 64, the sleeve part is sleeved outside the rotating shaft center, and the locking deflector rod 8b is capable of rotating around the rotating shaft center through the sleeve part. The arrangement of the sleeve part and the rotating shaft center of the second pin shaft 31 solves the problem of wear between the second pin shaft 31 and the second support 64 caused by frequent switching-on and switching-off of the leakage protector in an actual using process of the leakage protector of the present disclosure. In an exemplary embodiment, the first pin shaft 21 and the first support 43 adopt the same hinged structure, so that the service life of the leakage protector is effectively ensured.

Embodiment 2

Figure 7:
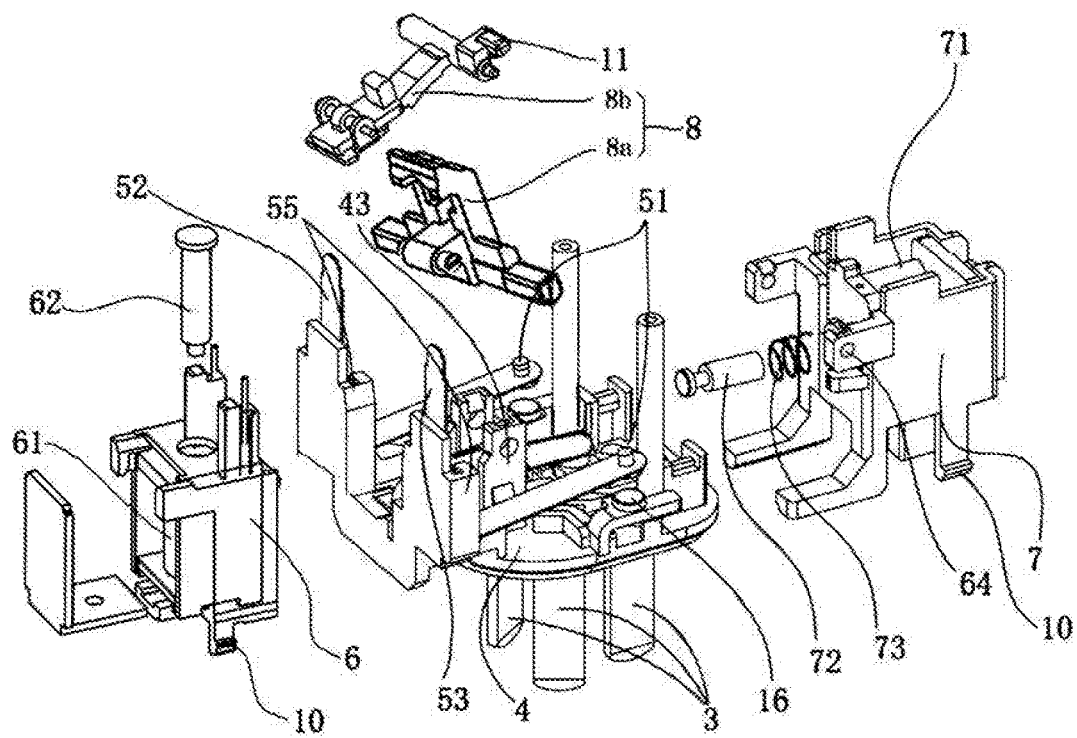
FIG. 7 illustrates another structural diagram of a leakage protector according to an embodiment 2 of the present disclosure.

As shown in FIG. 7, compared with Embodiment 1, the elastic sheet 5 includes a first elastic sheet 52 and a second elastic sheet 53, and the first elastic sheet 52 and the second elastic sheet 53 are fixed by the elastic sheet slots 55 disposed at two sides of the communication maintaining device 6 respectively; tops of the pins 3 are provided with electrical connection contacts 16, and ends of the first elastic sheet 52 and the second elastic sheet 53 are provided with elastic sheet contacts 51 corresponding to the electrical connection contacts 16; and when the pressing rod 22 presses the elastic sheet 5 downward, the elastic sheet contacts 51 are in contact with the electrical connection contacts 16. In the present embodiment, the first elastic sheet 52 and the second elastic sheet 53 correspond to a live wire pin and a zero wire pin respectively, and a PE wire is not be disconnected. Furthermore, the PE wire elastic sheet 54 is removed, and a PE wire pin is connected with the PE wire through a lead wire, so that the PE wire is maintained in a continuously connected state.

Embodiment 3

Figure 6:
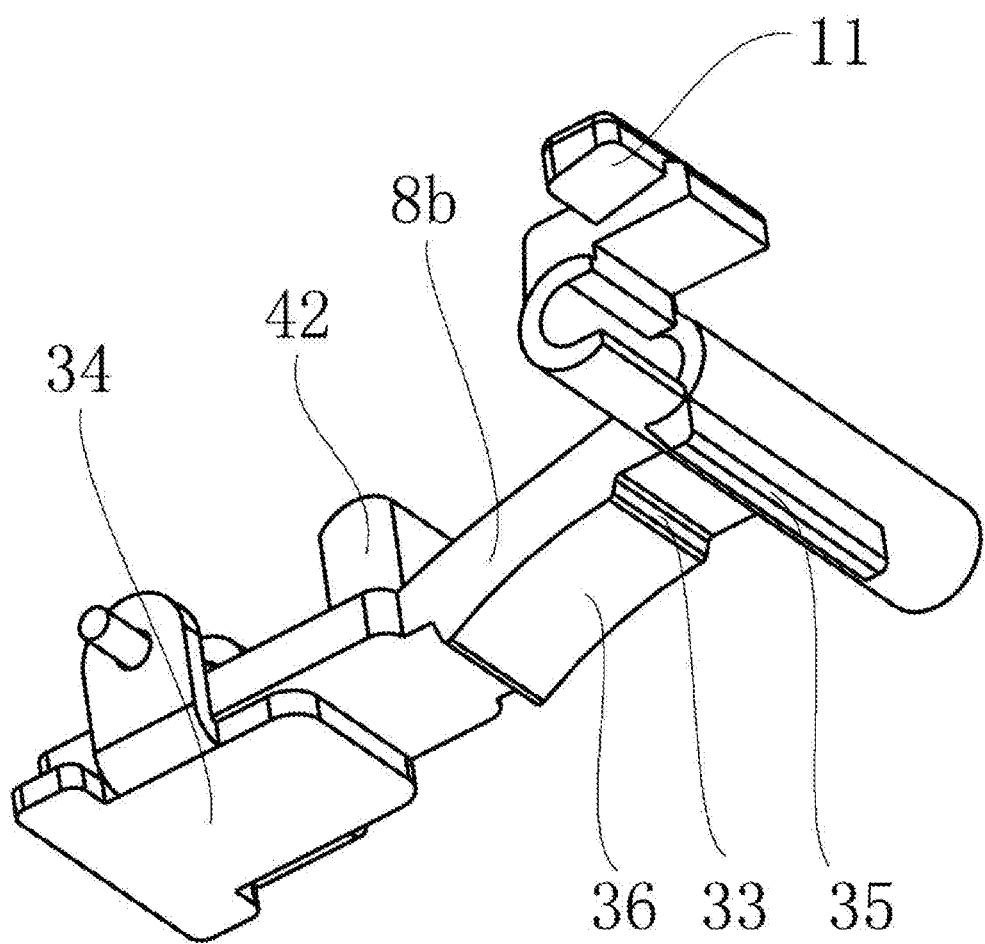
FIG. 6 illustrates a structural diagram of a locking deflector rod of the leakage protector according to an embodiment of the present disclosure.

As shown in FIG. 5 and FIG. 6, compared with Embodiment 1, the leakage protector further comprises a pressing top block 35 provided on the locking deflector rod 8b, and the pressing top block 35 is positioned at one side of a latch 33; and when a power source is switched on, a second iron core 72 drives an elastic sheet pressing block 8a to rotate by a vertical fork groove 23, a hasp 24 slides upward along a hasp slide way 36, and the hasp 24 instantly abuts against the pressing top block 35 after sliding through the latch 33, so that a movable pressing plate 34 moves downward to the minimum position. That is, by the arrangement of the pressing top block 35, the hasp 24 pushes the movable pressing plate 34 to rotate for an additional angle, so that the movable pressing plate 34 moves to the minimum position. When the power source is switched on, the elastic sheet pressing block 8a is pulled to the position of the maximum rotation angle while the second iron core 72 retracts, at this time, the hasp 24 sequentially passes through the hasp slide way 36 and the latch 33 and finally abuts against the pressing top block 35, and then, the hasp 24 pushes the movable pressing plate 34 to rotate for an additional angle to move to the minimum position, thereby ensuring that the movable pressing plate 34 is adsorbed by the first iron core 62 under the action of a maintaining coil 61.

Embodiment 4

As shown in FIG. 1 and FIG. 5, compared with Embodiment 1, the leakage protector comprises a limiting baffle 11 provided on the locking deflector rod 8b, and the limiting baffle 11 is disposed at an end of the locking deflector rod 8b and is positioned at an upper part of a second support 64; and when a power source is switched off, the limiting baffle 11 abuts against the second support 64 so as to limit a rotation angle of the locking deflector rod 8b. That is, the limiting baffle 11 abuts against a top surface of one side of the second support 64, so that after the power source is switched off, the locking deflector rod 8b only rotates around a second pin shaft 31 within a limited range to prevent influence on other parts.

Embodiment 5

In Embodiment 5, a locking deflector rod 8b is also provided with a pressing plate pin hole 63, the pressing plate pin hole 63 is positioned at an upper part of the locking deflector rod 8b, and a movable pressing plate 34 is matched and hinged with the pressing plate pin hole 63 by a pin shaft. That is, the movable pressing plate 34 is movably hinged with the locking deflector rod 8b, and the movable pressing plate 34 rotates around the pin shaft within a certain range, thereby ensuring that the movable pressing plate 34 has a maximum contact area when in adsorption contact with a first iron core 62, a larger adsorption capacity is ensured, and the service life of the leakage protector is effectively prolonged.

In an actual working process of the leakage protector, the leakage protector is connected into a circuit to be protected; when a power source is switched on, a communication coil 71 in a communication device 7 is electrified, and a second iron core 72 retracts; because the second iron core 72 is clamped with a vertical fork groove 23 on an elastic sheet pressing block 8a, the second iron core 72 drives the elastic sheet pressing block 8a to rotate while retracting, a pressing rod 22 positioned at the bottom of the elastic sheet pressing block 8a presses elastic sheet 5 downward to enable electrical connection contacts 16 to be in contact with elastic sheet contacts 51 to form a channel, and simultaneously, a hasp 24 abuts against a latch 33; at this time, the movable pressing plate 34 is adsorbed by the first iron core 62 under the action of a maintaining coil 61, so as to enable the movable pressing plate 34 to be always in a pressed state, so that the leakage protector maintains circuit switching-on; when the circuit is switched on, a red indicating block 42 on the locking deflector rod 8b moves to a position under an observation window 15 to achieve an indicating effect; and when the circuit to be protected has a condition of electric leakage or power failure, a communication maintaining device 6 stops working, the movable pressing plate 34 loses the downward adsorption force of the first iron core 62, the hasp 24 is disengaged from the latch 33, and the elastic sheet pressing block 8a does not press the elastic sheet 5 downward, so that the leakage protector is switched off to achieve the purpose of protection. Under the condition of power loss, such as power failure and circuit switching-off, the leakage protector of the present disclosure is switched off to ensure safety and reliability.

Embodiment 6

Figure 8:
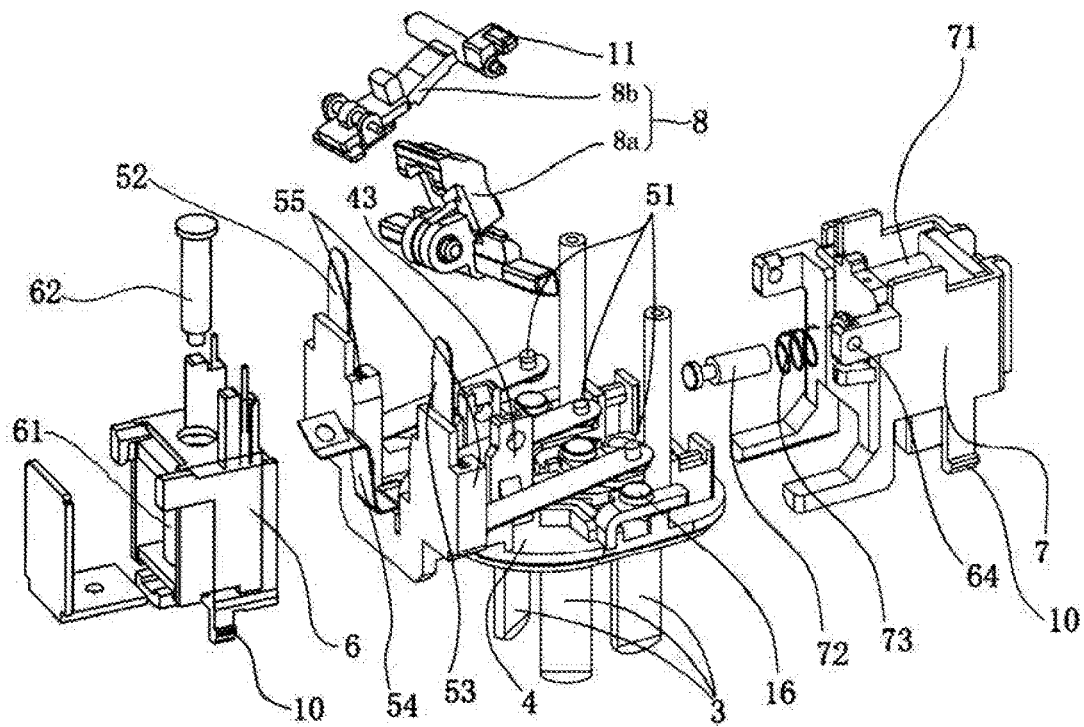
FIG. 8 illustrates another exploded diagram of the leakage protector according to an embodiment of the present disclosure.

As shown in FIG. 8 and FIG. 2, a leakage protector according to an embodiment of the present disclosure includes a protector housing 1, a protector device 2, pins 3, a bottom plate 4 and a elastic sheet 5, wherein the protector device 2 is disposed at an upper part of the bottom plate 4, the protector device 2 controls switching-on and switching-off of the leakage protector, and the pins 3 are disposed at a lower part of the bottom plate 4;

the protector device 2 includes a communication maintaining device 6, a communication device 7 and a locking device 8, and the locking device 8 is disposed between the communication maintaining device 6 and the communication device 7 and is configured to control disconnection and connection of the elastic sheet 5 and the pins 3;

the locking device 8 includes an elastic sheet pressing block 8a and a locking deflector rod 8b, the locking deflector rod 8b is movably hinged with a second support 64 disposed on the communication device 7 by a second pin shaft 31, and the elastic sheet pressing block 8a is movably hinged with a first support 43 disposed in a middle position of the bottom plate 4 by a first pin shaft 21; wherein the locking device 8 includes a latch 33, a movable pressing plate 34 and a hasp slide way 36, the latch 33, the movable pressing plate 34 and the hasp slide way 36 is provided on the locking deflector rod 8b and a pressing block upper part 8c and a pressing block lower part 8d, the locking device 8 includes a hasp 24, a vertical fork groove 23 provided on the pressing block upper part 8c, a pressing rod 22 is provided on the pressing block lower part 8d and a pressing block spring 9, the pressing block upper part 8c is hinged with the pressing block lower part 8d by a first pin shaft 21, and the pressing block spring 9 in a compressed state is disposed between the pressing block upper part 8c and the pressing block lower part 8d; when the pressing rod 22 abuts against the elastic sheet 5, an elasticity of the pressing block springs 9 enables the pressing rod 22 to maintain a stable action force against the elastic sheet 5, and the hasp 24 is configured to abut against the latch 33; and according to different needs of users, the positions of the first support 43 and the second support 64 can be adjusted.

Figure 12:
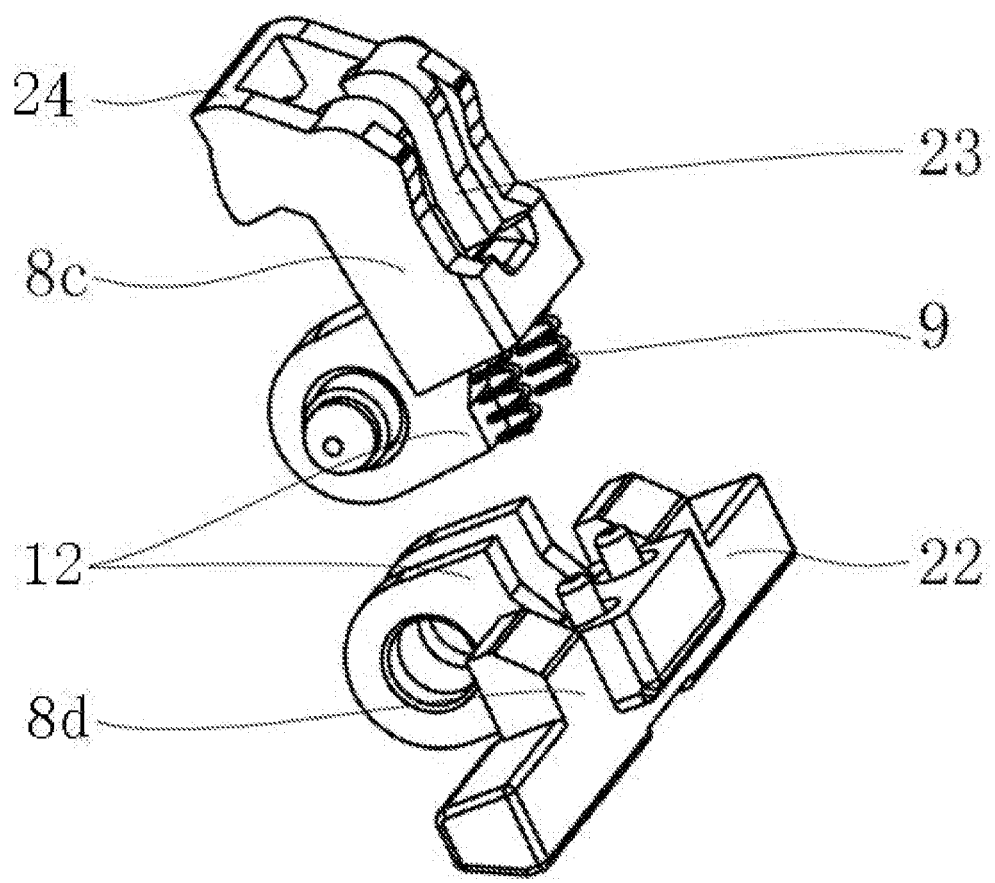
FIG. 12 illustrates another structural diagram of an elastic sheet pressing block of the leakage protector according to an embodiment of the present disclosure.
Figure 13:
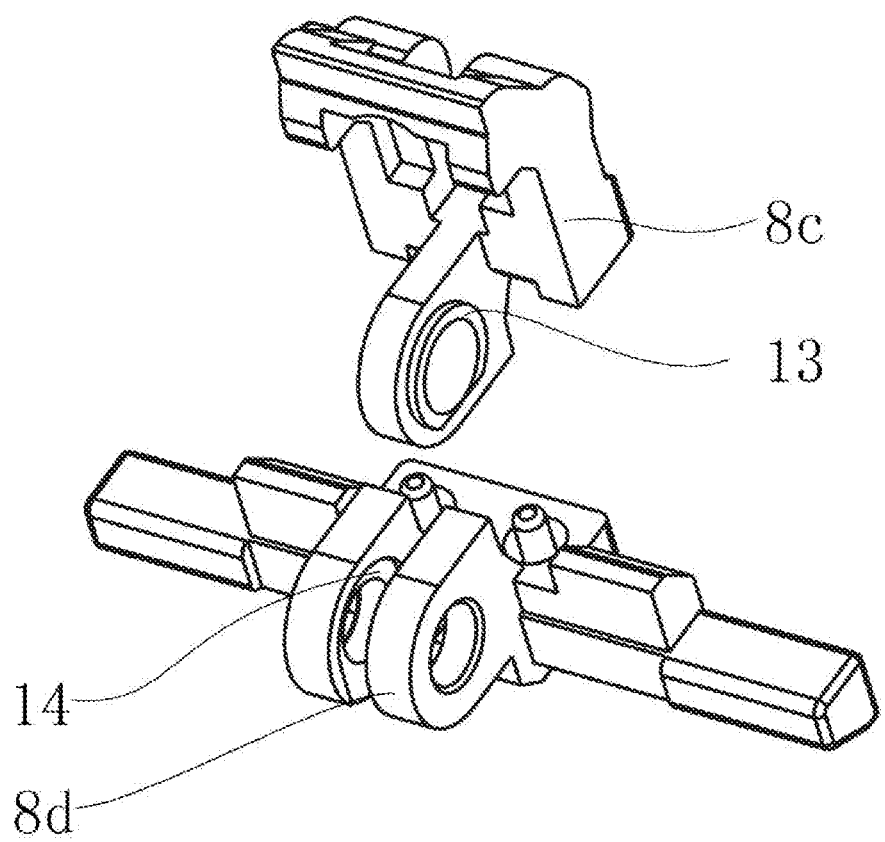
FIG. 13 illustrates another structural diagram of the elastic sheet pressing block of the leakage protector according to an embodiment of the present disclosure.

As shown in FIG. 6, FIG. 12 and FIG. 13, a hinged seat is disposed at a hinged portion of the pressing block upper part and a pressing block lower part respectively, and the first pin shaft 21 penetrates through an inside of the hinged seat, so that the pressing block upper part and the pressing block lower part rotates around the first pin shaft 21; the hinged seat is further provided with a limit stop 12, and the limit stop 12 is configured to control an opening angle between the pressing block upper part 8c and the pressing block lower part 8d when the pressing block upper part 8c and the pressing block lower part 8d rotates by taking the first pin shaft 21 as an axial center, so that when the pressing block upper part 8c and the pressing block lower part 8d rotates around the first pin shaft 21, the angle between the pressing block upper part 8c and the pressing block lower part 8d, by virtue of the design, after being assembled, the elastic sheet pressing block 8a can not be automatically disassembled due to the action of elasticity of the pressing block spring 9, so that the pressing block upper part 8c and the pressing block lower part 8d can be limited;

the leakage protector includes an indicating block provided on the pressing block upper part and the pressing block lower part are provided with spring grooves in positions corresponding to the pressing block springs 9, the spring grooves are configured to install the pressing block springs 9, and the pressing block springs can not fall off and are simpler and more convenient to install; further, spring pillars are further disposed in the spring grooves, the spring pillars are configured to install the pressing block springs 9, and the pressing block springs 9 are sleeved on the spring pillars, so that the installing and fixing effects are enhanced;

the communication device 7 includes a second iron core 72 extending transversely, and the second iron core 72 is in clamping fit with the vertical fork groove 23; and the communication maintaining device 6 is provided with a first iron core 62 disposed longitudinally, the first iron core 62 is fixed on the communication maintaining device 6, and the first iron core 62 is in adsorption fit with the movable pressing plate 34.

Figure 11:
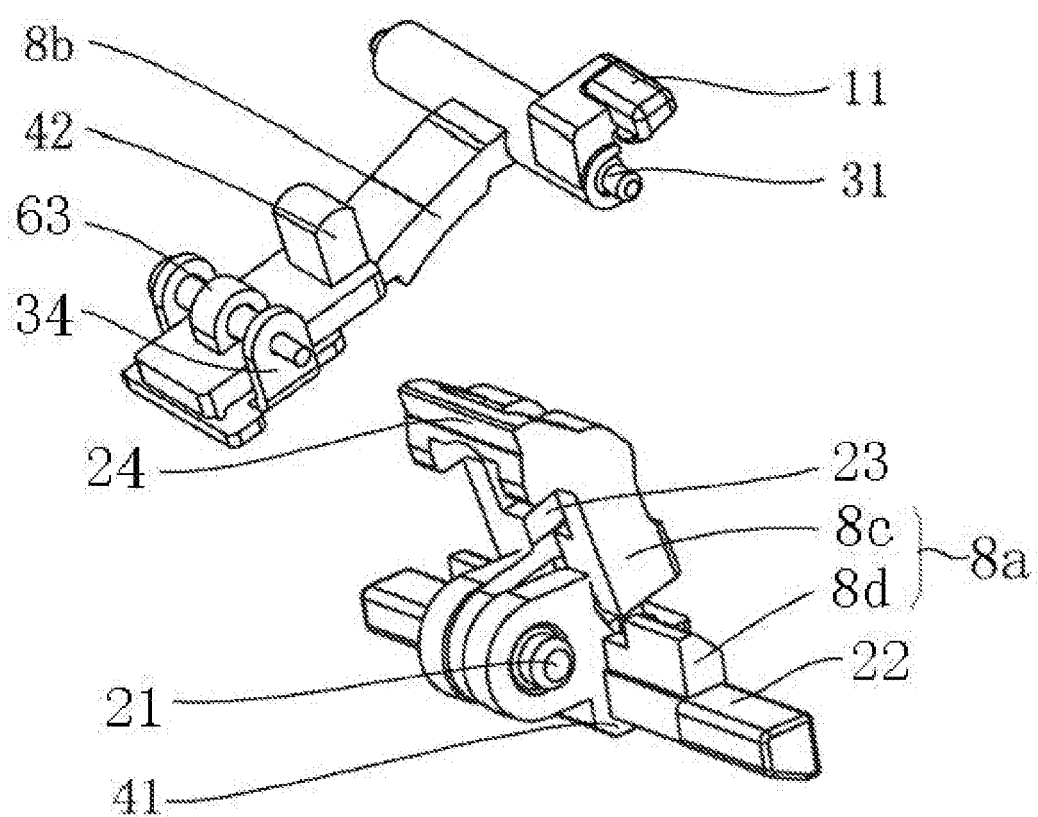
FIG. 11 illustrates another structural diagram of a locking device of the leakage protector according to an embodiment of the present disclosure.

As shown in FIG. 8 and FIG. 11, when the hasp 24 slides counterclockwise along the hasp slide way 36, the locking deflector rod 8b continuously rotates clockwise, thereby avoiding the condition of standstill or jump of the movable pressing plate 34 when the hasp 24 slides counterclockwise along the hasp slide way 36, wherein the standstill or jump will affect the speed of adsorption and fixation of the movable pressing plate 34 and the first iron core 62, and too low speed will cause communication failure of the leakage protector.

Figure 10:
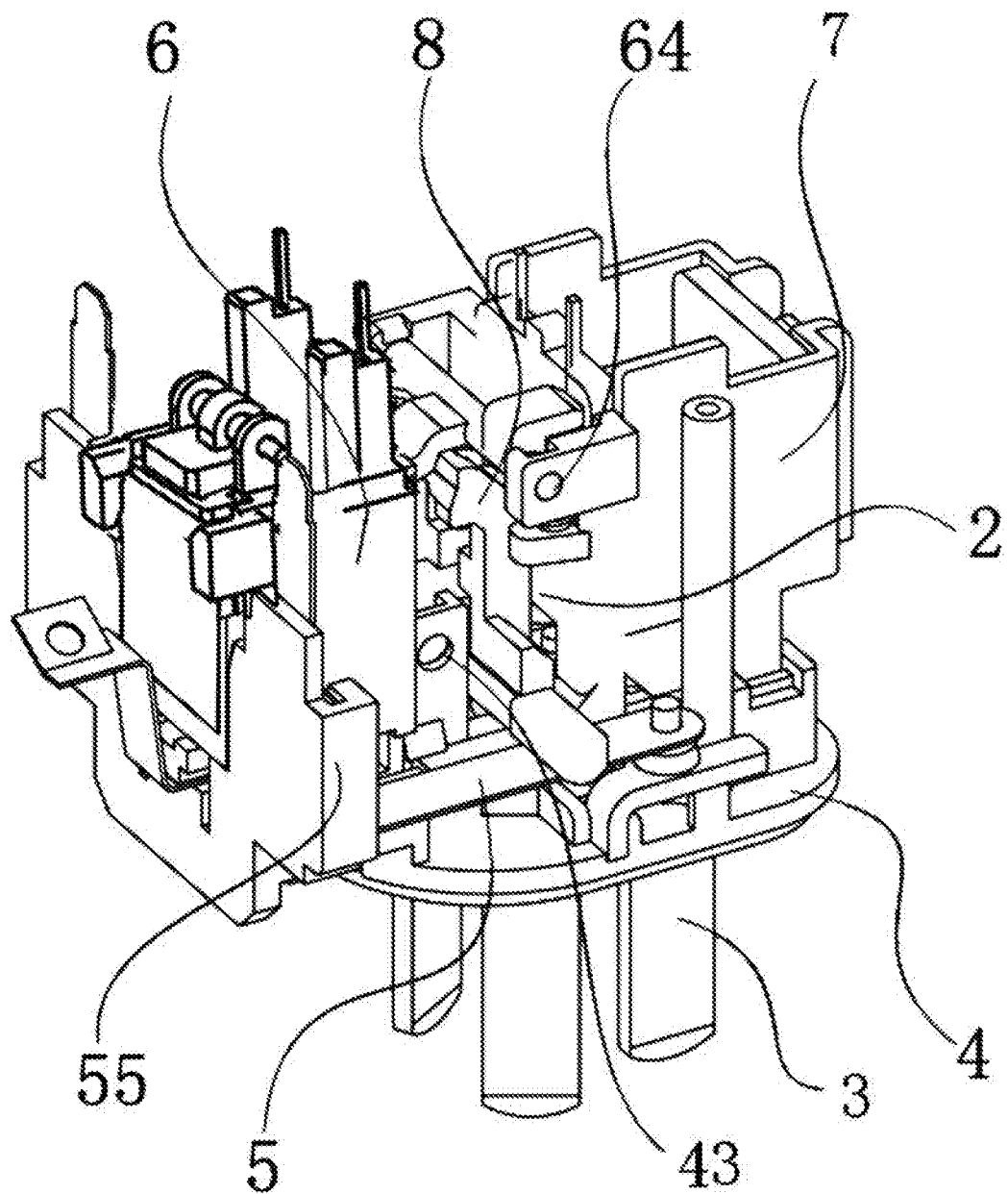
FIG. 10 illustrates another structural diagram of the leakage protector according to an embodiment of the present disclosure when the power source is in a switched-on state.

As shown in FIG. 8 and FIG. 10, when a power source is switched on, the second iron core 72 drives the elastic sheet pressing block 8*a* to rotate by the vertical fork groove 23, so that the pressing rod 22 positioned at a bottom of the elastic sheet pressing block 8*a* presses the elastic sheet 5 downward, and meanwhile, the hasp 24 slides upward along the hasp slide way 36; furthermore, in a process that the hasp 24 slides to abut against the latch 33, the movable pressing plate 34 is driven to continuously move downward; and the movable pressing plate 34 is adsorbed and fixed by the first iron core 62, and the communication maintaining device 6 is configured to fix a position of the locking deflector rod 8*b* so as to enable the elastic sheet pressing block 8*a* to be maintained in a pressed state and enable the elastic sheet 5 and the pins 3 to be maintained in a connected state, thereby realizing circuit switching-on.

Figure 9:
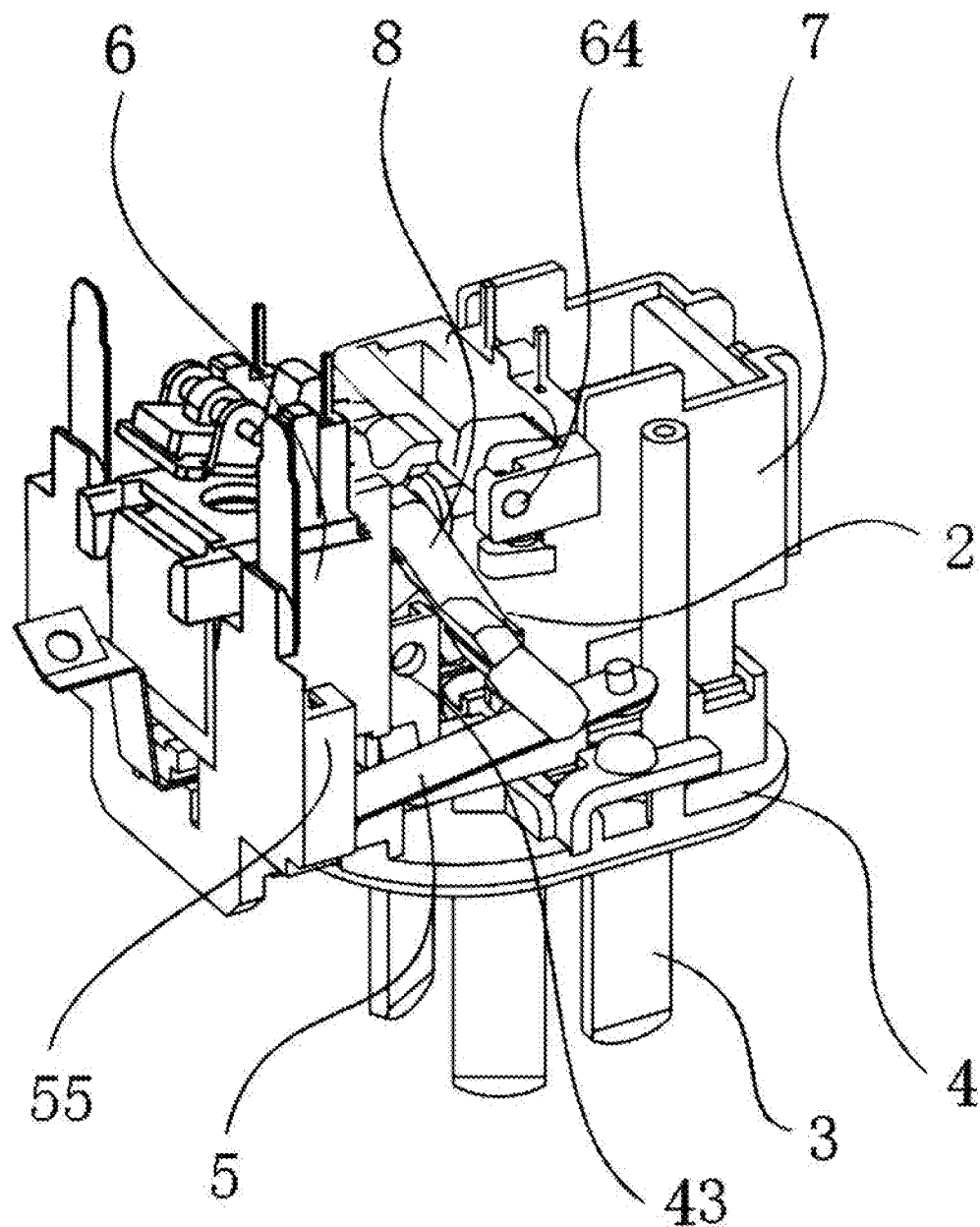
FIG. 9 illustrates another structural diagram of the leakage protector according to an embodiment of the present disclosure when the power source is in a switched-off state.

As shown in FIG. 8 and FIG. 9, when the power source is switched off, the communication maintaining device 6 stops working, the locking deflector rod 8*b* is released, and the latch 33 is disengaged from the hasp 24 to enable the elastic sheet 5 to be disconnected from the pins 3, thereby realizing circuit switching-off.

As shown in FIG. 8 and FIG. 2, the leakage protector further comprises an indicating block 42 provided on the locking deflector rod 8*b*, and the indicating block 42 is positioned at an upper part of the locking deflector rod 8*b*; when the power source is switched on, the indicating block 42 moves into an observation window 15 of a protector housing 1; and when the power source is switched off, the indicating block 42 is removed from the observation window 15 of the protector housing 1. The indicating block 42 can well indicate the working state of the leakage protector. The red indicating block 42 is more conspicuous and has a good reminding effect.

As shown in FIG. 8, the elastic sheet 5 include a first elastic sheet 52, a second elastic sheet 53 and a PE wire elastic sheet 54, the first elastic sheet 52 and the second elastic sheet 53 are respectively fixed by elastic sheet slots 55 disposed at two sides of the communication maintaining device 6, and the PE wire elastic sheet 54 passes through bottom of the communication maintaining device 6 and is clamped and fixed with the communication maintaining device 6 by the bottom plate 4; three pins 3 of a zero wire, a live wire and a PE wire are disposed corresponding to the elastic sheet 5, tops of the pins 3 are provided with electrical connection contacts 16, and ends of the elastic sheet 5 are provided with elastic sheet contacts 51 corresponding to the electrical connection contacts 16; when the pressing rod 22 presses the elastic sheet 5 downward, the elastic sheet contacts 51 are in contact with the electrical connection contacts 16 respectively, thereby well ensuring the stability of circuit connection and avoiding circuit connection problems in a using process; in an using process, each of the elastic sheet contact 51 on the PE wire elastic sheet 54 is provided with a disconnected state for disconnecting from the electrical connection contact 16 on the pin 3 for connecting the PE wire and a connected state for connecting with the electrical connection contact 16; and the first elastic sheet 52 is a live wire elastic sheet, the second elastic sheet 53 is a zero wire elastic sheet, and the PE wire elastic sheet 54 is an earth wire elastic sheet.

As shown in FIG. 8, the leakage protector includes a plurality of buckle feet 10 which are wedge-shaped, the plurality of buckle feet 10 are provided on bottoms of the communication maintaining device 6 and the communication device 7 respectively, and the communication maintaining device 6 and the communication device 7 are fastened and fixed with the bottom plate 4 respectively by the plurality of buckle feet 10. The installation is simple, convenient, firm and reliable, and a mold issued for die sinking directly, thereby reducing the production cost.

As shown in FIG. 8, the communication device 7 further includes a communication coil 71 and a communication spring 73, the communication coil 71 is fixed inside the communication device 7, and the communication spring 73 and the second iron core 72 are horizontally disposed in an inner cavity of the communication coil 71 in sequence; when the power source is switched off, the second iron core 72 is pushed out by the elasticity of the communication spring 73 and enables the elastic sheet pressing block 8*a* to rotate clockwise, and at this time, the elasticity of the elastic sheet 5 further enables the elastic sheet pressing block 8*a* to rotate clockwise, so that the pressing rod 22 is lifted and the elastic sheet 5 are released; and when the power source is switched on, the communication coil 71 is electrified, so that the second iron core 72 is clamped with the vertical fork groove 23 to drive the elastic sheet pressing block 8*a* to rotate counterclockwise.

As shown in FIG. 8, the communication maintaining device 6 further includes a maintaining coil 61, the maintaining coil 61 is fixed inside the communication maintaining device 6, and the first iron core 62 is vertically disposed in an inner cavity of the maintaining coil 61; one end of the first iron core 62 is fixedly connected with the bottom of the communication maintaining device 6, and the other end of the first iron core 62 is configured to adsorb the movable pressing plate 34; when the power source is switched on, the maintaining coil 61 is electrified, and the movable pressing plate 34 is adsorbed by the first iron core 62, so that the hasp 24 abuts against the latch 33, and the leakage protector is in a switched-on state; and when the power source is switched off, the maintaining coil 61 is powered off, the movable pressing plate 34 is released, the latch 33 is disengaged from the hasp 24, and the elastic sheet 5 are disconnected from the pins 3, thereby realizing circuit switching-off.

As shown in FIG. 11, the leakage protector includes a bulge 41, wherein the bulge 41 is disposed in a position, corresponding to the PE wire elastic sheet 54, of the pressing rod 22, that is, the bulge 41 on the pressing rod 22 is in direct contact with the PE wire elastic sheet 54; when the pressing rod 22 is pressed downward, the bulge 41 enables the PE wire elastic sheet 54 to be connected with the pins 3 before the first elastic sheet 52 and the second elastic sheet 53; and when the pressing rod 22 is lifted, the bulge 41 enables the PE wire elastic sheet 54 to be disconnected from the pins 3 after the first elastic sheet 52 and the second elastic sheet 53. In an exemplary embodiment, when the power source is switched on, firstly, the PE wire elastic sheet 54 is connected with a first pin of the pins 3, and then, the first elastic sheet 52 and the second elastic sheet 53 are connected with a second and third pins of the pins 3 respectively; and when the power source is switched off, firstly, the first elastic sheet 52 and the second elastic sheet 53 are disconnected from the second and third pins of the pins 3, and then, the PE wire elastic sheet 54 is disconnected from the first pin of pins 3.

When the elastic sheet 5 is pressed downward, the bulge 41 at a top of the PE wire elastic sheet 54 is in contact with the PE wire elastic sheet 54 firstly to enable the elastic sheet contact 51 on the PE wire elastic sheet 54 to be in contact with the electrical connection contact 16 on the pin 3 for connecting the PE wire firstly, and then, the elastic sheet contact 51 on the live wire elastic sheet and the elastic sheet contact 51 on the zero wire elastic sheet are in contact with the electrical connection contacts 16 on the pins 3, so that in a process of circuit switching-on, firstly, the earth wire is in contact connection, and then, the zero wire and the live wire are in contact connection. When the elastic sheet 5 is reset and move upward, firstly, the elastic sheet contact 51 on the live wire elastic sheet and the elastic sheet contact 51 on the zero wire elastic sheet are separated from the electrical connection contacts 16 on the pins 3, and then, the elastic sheet contact 51 on the PE wire elastic sheet 54 is separated from the electrical connection contact 16 on the pin 3 for connecting the PE wire, so that in the switching-off work, firstly, the zero wire and the live wire are separated, and then, the earth wire is separated.

In an exemplary embodiment, as shown in FIG. 11, the second pin shaft 31 includes a sleeve part and a rotating shaft center, the sleeve part is disposed on the locking deflector rod 8b, the rotating shaft center is disposed on the second support 64, the sleeve part is sleeved outside the rotating shaft center, and the locking deflector rod 8b is capable of rotating around the rotating shaft center through the sleeve part. The arrangement of the sleeve part and the rotating shaft center of the second pin shaft 31 solves the problem of wear between the second pin shaft 31 and the second support 64 caused by frequent switching-on and switching-off of the leakage protector in an actual using process of the leakage protector of the present disclosure. In an exemplary embodiment, the first pin shaft 21 and the first support 43 adopt the same hinged structure, so that the service life of the leakage protector is effectively ensured.

Embodiment 7

Figure 14:
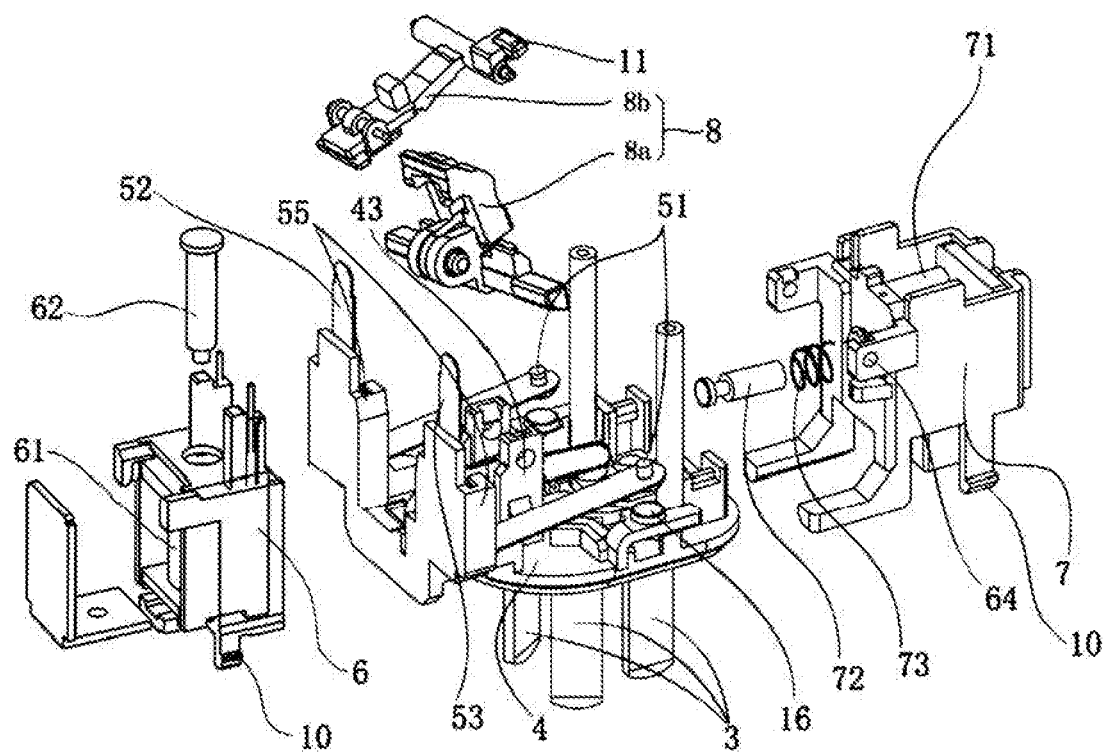
FIG. 14 illustrates a structural diagram of a leakage protector according to an embodiment 7 of the present disclosure.

As shown in FIG. 14, compared with Embodiment 6, elastic sheet 5 includes a first elastic sheet 52 and a second elastic sheet 53, and the first elastic sheet 52 and the second elastic sheet 53 are respectively fixed by elastic sheet slots 55 disposed at two sides of a communication maintaining device 6; tops of pins 3 are provided with electrical connection contacts 16, and ends of the first elastic sheet 52 and the second elastic sheet 53 are provided with elastic sheet contacts 51 corresponding to the electrical connection contacts 16; and when a pressing rod 22 presses the elastic sheet 5 downward, the elastic sheet contacts 51 are in contact with the electrical connection contacts 16. In the present embodiment, the first elastic sheet 52 and the second elastic sheet 53 correspond to a live wire pin and a zero wire pin respectively, and a PE wire can not be disconnected. Furthermore, in the present embodiment, the PE wire elastic sheet 54 is removed, and a PE wire pin is connected with the PE wire by a lead wire, so that the PE wire is maintained in a continuously connected state.

Embodiment 8

As shown in FIG. 12 and FIG. 13, compared with Embodiment 6, the locking device 8 comprises a pre-hinging device, the pre-hinging device is provided on the hinged seat, the pre-hinging device includes a lug boss 13 and a clamping groove 14, the lug boss 13 is positioned at the hinged portion of a pressing block upper part 8c, the clamping groove 14 is positioned at the hinged portion of a pressing block lower part 8d, and pre-hinging of the pressing block upper part 8c and the pressing block lower part 8d is realized by the cooperation of the lug boss 13 and the clamping groove 14. That is, under the condition that a first pin shaft 21 is not installed, the installation work of an elastic sheet pressing block 8a can also be completed. Furthermore, by virtue of the design, the coaxality of the pressing block upper part 8c and the pressing block lower part 8d is further ensured, the wear is reduced, and the integral installation is simpler and more convenient.

Embodiment 9

Compared with Embodiment 8, a lug boss 13 is positioned at the hinged portion of a pressing block lower part 8d, and pre-hinging of a pressing block upper part 8c and the pressing block lower part 8d is realized by the cooperation of the lug boss 13 and a clamping groove 14.

Embodiment 10

As shown in FIG. 11 and FIG. 6, compared with Embodiment 6, the leakage protector further includes a pressing top block 35, the pressing top block 35 is provided on the locking deflector rod 8b, and the pressing top block 35 is positioned at one side of a latch 33; and when a power source is switched on, a second iron core 72 drives an elastic sheet pressing block 8a to rotate by the vertical fork groove 23, the hasp 24 slides upward along a hasp slide way 36, and the hasp 24 instantly abuts against the pressing top block 35 after sliding through the latch 33, so that a movable pressing plate 34 moves downward to the minimum position. That is, by the arrangement of the pressing top block 35, the hasp 24 pushes the movable pressing plate 34 to rotate for an additional angle, so that the movable pressing plate 34 moves to the minimum position. When the power source is switched on, the elastic sheet pressing block 8a is pulled to the position of the maximum rotation angle while the second iron core 72 retracts, at this time, the hasp 24 sequentially passes through the hasp slide way 36 and the latch 33 and finally abuts against the pressing top block 35, and then, the hasp 24 pushes the movable pressing plate 34 to rotate for an additional angle to move to the minimum position, thereby ensuring that the movable pressing plate 34 is adsorbed by the first iron core 62 under the action of a maintaining coil 61.

Embodiment 11

As shown in FIG. 8 and FIG. 11, compared with Embodiment 6, the leakage protector includes a limiting baffle 11 provided on a locking deflector rod 8b is also provided with a limiting baffle 11, and the limiting baffle 11 is disposed at an end of the locking deflector rod 8b and is positioned at an upper part of a second support 64; and when a power source is switched off, the limiting baffle 11 abuts against the second support 64 so as to limit a rotation angle of the locking deflector rod 8b. That is, the limiting baffle 11 abuts against a top surface of one side of the second support 64, so that after the power source is switched off, the locking deflector rod 8b only rotates around a second pin shaft 31 within a limited range to prevent influence on other parts.

Embodiment 12

In Embodiment 7, a locking deflector rod 8b is also provided with a pressing plate pin hole 63, the pressing plate pin hole 63 is positioned at the upper part of the locking deflector rod 8b, and a movable pressing plate 34 is matched and hinged with the pressing plate pin hole 63 by a pin shaft.

That is, the movable pressing plate 34 is movably hinged with the locking deflector rod 8b, and the movable pressing plate 34 rotates around the pin shaft within a certain range, thereby ensuring that the movable pressing plate 34 has a maximum contact area when in adsorption contact with a first iron core 62, a larger adsorption capacity is ensured, and the service life of the leakage protector is effectively prolonged.

In an actual working process of the leakage protector, the leakage protector is connected into a circuit to be protected; when the power source is switched on, a communication coil 71 in a communication device 7 is electrified, and a second iron core 72 retracts; because the second iron core 72 is clamped with a vertical fork groove 23 on the elastic sheet pressing block 8a, the second iron core 72 drives the elastic sheet pressing block 8a to rotate while retracting, a pressing rod 22 positioned at the bottom of the elastic sheet pressing block 8a presses the elastic sheet 5 downward to enable electrical connection contacts 16 to be in contact with elastic sheet contacts 51 to form a channel, and simultaneously, a hasp 24 abuts against a latch 33; at this time, the movable pressing plate 34 is adsorbed by the first iron core 62 under the action of a maintaining coil 61, so as to enable the movable pressing plate 34 to be always in a pressed state, so that the leakage protector maintains circuit switching-on; when the circuit is switched on, a red indicating block 42 on a fork groove pressing rod 14 moves to a position under an observation window 15 to achieve an indicating effect; and when the circuit to be protected has a condition of electric leakage or power failure, a communication maintaining device 6 stops working, the movable pressing plate 34 loses the downward adsorption force of the first iron core 62, the hasp 24 is disengaged from the latch 33, and the elastic sheet pressing block 8a does not press the elastic sheet 5 downward, so that the leakage protector is switched off to achieve the purpose of protection.

The above embodiments are merely preferred embodiments of the present disclosure. It should be noted that those skilled in the art can make several improvements and modifications without departing from the technical principles of the present disclosure, and these improvements and modifications should also fall within the scope of protection of the present disclosure.

What is claimed is:

1. A leakage protector, comprising: a protector device (2), pins (3), a bottom plate (4) and a elastic sheet (5), wherein the protector device (2) is disposed at an upper part of the bottom plate (4), the protector device (2) controls switching-off and switching-on of the leakage protector, and the pins (3) are disposed at a lower part of the bottom plate (4);

the protector device (2) comprises a communication maintaining device (6), a communication device (7) and a locking device (8), and the locking device (8) is disposed between the communication maintaining device (6) and the communication device (7) and is configured to control disconnection and connection of the elastic sheet (5) and the pins (3);

the locking device (8) comprises an elastic sheet pressing block (8a) and a locking deflector rod (8b), the locking deflector rod (8b) is movably hinged with a second support (64) disposed on the communication device (7) by a second pin shaft (31), and the elastic sheet pressing block (8a) is movably hinged with a first support (43) disposed in a middle position of the bottom plate (4) by a first pin shaft (21); wherein the locking device (8) comprises a latch (33), a movable pressing plate (34) and a hasp slide way (36) provided on the locking deflector rod (8b) and a hasp (24), a vertical fork groove (23) and a pressing rod (22) provided on the elastic sheet pressing block (8a), and the hasp (24) is configured to abut against the latch (33);

the communication device (7) comprises a second iron core (72) extending transversely, and the second iron core (72) is in clamping fit with the vertical fork groove (23); the communication maintaining device (6) comprises a first iron core (62) disposed longitudinally, and the first iron core (62) in an energized state is configured to be in magnetic adsorption fit with the movable pressing plate (34);

when a power source is switched on, the second iron core (72) drives the elastic sheet pressing block (8a) to rotate by the vertical fork groove (23), so that the pressing rod (22) positioned at a bottom of the elastic sheet pressing block (8a) presses the elastic sheet (5) downward, and meanwhile, the hasp (24) slides upward along the hasp slide way (36); furthermore, in a process that the hasp (24) slides to abut against the latch (33), the movable pressing plate (34) continuously moves downward, and the movable pressing plate (34) is adsorbed and fixed by the first iron core (62); the communication maintaining device (6) is configured to fix a position of the locking deflector rod (8b) to enable the elastic sheet pressing block (8a) to be maintained in a pressed state and, enable the elastic sheet (5) and the pins (3) to be maintained in a connected state, thereby realizing circuit switching-on; and when the power source is switched off, the communication maintaining device (6) stops working, the locking deflector rod (8b) is released, and the latch (33) is disengaged from the hasp (24) to enable the elastic sheet (5) to be disconnected from the pins (3), thereby realizing circuit switching-off.

2. The leakage protector according to claim 1, wherein the elastic sheet (5) comprises a first elastic, sheet (52), a second elastic sheet (53) and a PE wire elastic sheet (54), the first elastic sheet (52) and the second elastic sheet (53) are respectively fixed by elastic sheet slots (55) disposed at two sides of the communication maintaining device (6), and the PE wire elastic sheet (54) passes through a bottom of the communication maintaining device (6) and is clamped and fixed with the communication maintaining device (6) by the bottom plate (4);

tops of the pins (3) are provided with electrical connection contacts (16), ends of the first elastic sheet (52), the second elastic sheet (53) and the PE wire elastic sheet (54) are provided with elastic sheet contacts (51) corresponding to the electrical connection contacts (16); and when the pressing rod (22) presses the elastic sheet (5) downward, the elastic sheet contacts (51) are in contact with the electrical connection contacts (16) respectively, and the elastic sheet contacts (51) on the first elastic sheet (52); in an using process, each of the second elastic sheet (53) and the PE wire elastic sheet (54) is provided with a disconnected state for disconnecting from the electrical connection contact (16) and a connected state for connecting with the electrical connection contact (16).

3. The leakage protector according to claim 2, wherein the leakage protector comprises a bulge (41), wherein the bulge (41) is disposed in a position, corresponding to the PE wire elastic sheet (54), of the pressing rod (22); when the pressing rod (22) is pressed downward, the bulge (41) enables the PE wire elastic sheet (54) to be connected with the pins (3) before the first elastic sheet (52) and the second elastic sheet (53); and when the pressing rod (22) is lifted, the bulge (41) enables the PE wire elastic sheet (54) to be disconnected from the pins (3) after the first elastic sheet (52) and the second elastic sheet (53).

4. The leakage protector according to claim 2, wherein the leakage protector comprises a bulge (41), wherein the bulge (41) is disposed in a position, corresponding to the PE wire elastic sheet (54), of the pressing rod (22); when the pressing rod (22) is pressed downward, the bulge (41) enables the PE wire elastic sheet (54) to be connected with the pins (3) before the first elastic sheet (52) and the second elastic sheet (53); and when the pressing rod (22) is lifted, the bulge (41) enables the PE wire elastic sheet (54) to be disconnected from the pins (3) after the first elastic sheet (52) and the second elastic sheet (53).

5. The leakage protector according to claim 1, wherein the leakage protector comprises a plurality of buckle feet (10) which are wedge-shaped, the plurality of buckle feet (10) are provided on bottoms of the communication maintaining device (6) and the communication device (7) respectively, and the communication maintaining device (6) and the communication device (7) are fastened and fixed with the bottom plate (4) respectively by the plurality of buckle feet (10).

6. The leakage protector according to claim 1, wherein the communication device (7) further comprises a communication coil (71) and a communication spring (73), the communication coil (71) is fixed inside the communication device (7), and the communication spring (73) and the second iron core (72) are horizontally disposed in an inner cavity of the communication coil (71).

7. The leakage protector according to claim 1, wherein the communication maintaining device (6) further comprises a maintaining coil (61), the maintaining coil (61) is fixed inside the communication maintaining device (6), and the first iron core (62) is vertically fixed in an inner cavity of the maintaining coil (61); and one end of the first iron core (62) is fixedly connected with a bottom of the communication maintaining device (6), and the other end of the first iron core (62) is configured to adsorb the movable pressing plate (34).

8. The leakage protector according to claim 7, wherein the leakage protector further comprises a pressing plate pin hole (63) disposed on the locking deflector rod (8b), and the movable pressing plate (34) is matched and hinged with the pressing plate pin hole (63) by a pin shaft.

9. The leakage protector according to claim 1, wherein the second pin shaft (31) comprises a sleeve part and a rotating shaft center, the sleeve part is disposed on the locking deflector rod (8b), the rotating shaft center is disposed on the second support (64), the sleeve part is sleeved outside the rotating shaft center, and the locking deflector rod (8b) is capable of rotating around the rotating shaft center through the sleeve part.

10. The leakage protector according to claim 1, wherein the leakage protector further comprises a pressing top block (35) provided on the locking deflector rod (8b), and the pressing top block (35) is positioned at one side of the latch (33); and when the power source is switched on, the second iron core (72) drives the elastic sheet pressing block (8a) to rotate by the vertical fork groove (23), the hasp (24) slides upward along the hasp slide way (36), and the hasp (24) instantly abuts against the pressing top block (35) after sliding through the latch (33), so that the movable pressing plate (34) moves downward to be adsorbed and fixed by the first iron core (62).

11. The leakage protector according to claim 1, wherein the leakage protector further comprises an indicating block (42) provided on the locking deflector rod (8b), and the indicating block (42) is positioned at an upper part of the locking deflector rod (8b); when the power source is switched on, the indicating block (42) moves into an observation window (15) of a protector housing (1); when the power source is switched off, the indicating block (42) is removed from the observation window (15) of the protector housing (1); and the indicating block (42) is red.

12. The leakage protector according to claim 1, wherein the leakage protector comprises a limiting baffle (11) provided on the locking deflector rod (8b), and the limiting baffle (11) is disposed at an end of the locking deflector rod (8b) and is positioned at an upper part of the second support (64); and when the power source is switched off, the limiting baffle (11) abuts against the second support (64) so as to limit a rotation angle of the locking deflector rod (8b).

13. The leakage protector according to claim 1, wherein the elastic sheet (5) comprises a first elastic sheet (52) and a second elastic sheet (53), and the first elastic sheet (52) and the second elastic sheet (53) are fixed by the elastic sheet slots (55) disposed at two sides of the communication maintaining device (6) respectively;
tops of the pins (3) are provided with electrical connection contacts (16), and ends of the first elastic sheet (52) and the second elastic sheet (53) are provided with elastic sheet contacts (51) corresponding to the electrical connection contacts (16); when the pressing rod (22) presses the elastic sheet (5) downward, the elastic sheet contacts (51) are in contact with the electrical connection contacts (16); and in a using process, each of the elastic sheet contacts (51) on the first elastic sheet (52) and the second elastic sheet (53) is provided with a disconnected state for disconnecting from the electrical connection contact (16) and a connected state for connecting with the electrical connection contact (16), and a PE wire can not be disconnected and is maintained in a connected state.

14. The leakage protector according to claim 1, wherein the elastic sheet (5) comprises a first elastic sheet (52), a second elastic sheet (53) and a PE wire elastic sheet (54), the first elastic sheet (52) and the second elastic sheet (53) are respectively fixed by elastic sheet slots (55) disposed at two sides of the communication maintaining device (6), and the PE wire elastic sheet (54) passes through a bottom of the communication maintaining device (6) and is clamped and fixed with the communication maintaining device (6) by the bottom plate (4);
tops of the pins (3) are provided with electrical connection contacts (16), and ends of the first elastic sheet (52), the second elastic sheet (53) and the PE wire elastic sheet (54) are provided with elastic sheet contacts (51) corresponding to the electrical connection contacts (16); and when the pressing rod (22) presses the elastic sheet (5) downward, the elastic sheet contacts (51) are in contact with the electrical connection contacts (16) respectively, and in a using process, the elastic sheet contacts (51) on the first elastic sheet (52), each of the second elastic sheet (53) and the PE wire elastic sheet (54) is provided with a disconnected state for disconnecting from the electrical connection contact (16) and a connected state for connecting with the electrical connection contact (16).

15. The leakage protector according to claim 1, wherein the locking device (8) comprises a hinged seat disposed at a hinged portion of the pressing block upper part (8c) and the pressing block lower part (8d), the first pin shaft (21) penetrates through an inside of the hinged seat, the hinged seat is further provided with a limit stop (12), and the limit stop (12) is configured to control an opening angle between the pressing block upper part (8c) and the pressing block lower part (8d) when the pressing block upper part (8c) and the pressing block lower part (8d) rotate by taking the first pin shaft (21) as an axial center.

16. The leakage protector according to claim 15, wherein the locking device (8) comprises a pre-hinging device provided on the hinged seat, the pre-hinging device comprises a lug boss (13) and a clamping groove (14), the lug boss (13) is positioned at the hinged portion of the pressing block upper part (8c), the clamping groove (14) is positioned at the hinged portion of the pressing block lower part (8d), and pre-hinging of the pressing block upper part (8c) and the pressing block lower part (8d) is realized by a cooperation of the lug boss (13) and the clamping groove (14).

17. The leakage protector according to claim 15, wherein the locking device (8) comprises a pre-hinging device, the pre-hinging device is provided on the hinged seat, the pre-hinging device comprises a lug boss (13) and a clamping groove (14), the clamping groove (14) is positioned at the hinged portion of the pressing block upper part (8c), the lug boss (13) is positioned at the hinged portion of the pressing block lower part (8d), and pre-hinging of the pressing block upper part (8c) and the pressing block lower part (8d) is realized by the cooperation of the lug boss (13) and the clamping groove (14).

18. The leakage protector according to claim 1, wherein the leakage protector comprises a plurality of buckle feet (10) which are wedge-shaped, the plurality of buckle feet (10) are provided on bottoms of the communication maintaining device (6) and the communication device (7) respectively, and the communication maintaining device (6) and the communication device (7) are fastened and fixed with the bottom plate (4) respectively by the plurality of buckle feet (10).

19. The leakage protector according to claim 1, wherein the communication device (7) further comprises a communication coil (71) and a communication spring (73), the communication coil (71) is fixed inside the communication device (7), and the communication spring (73) and the second iron core (72) are horizontally disposed in an inner cavity of the communication coil (71).

20. The leakage protector according to claim 1, wherein the communication maintaining device (6) further comprises a maintaining coil (61), the maintaining coil (61) is fixed inside the communication maintaining device (6), and the first iron core (62) is vertically fixed in an inner cavity of the maintaining coil (61); and one end of the first iron core (62) is fixedly connected with a bottom of the communication maintaining device (6), and the other end of the first iron core (62) is configured to adsorb the movable pressing plate (34).

21. The leakage protector according to claim 20, wherein leakage protector further comprises a pressing plate pin hole (63) disposed on the locking deflector rod (8b), and the movable pressing plate (34) is matched and hinged with the pressing plate pin hole (63) by a pin shaft.

22. The leakage protector according to claim 1, wherein the second pin shaft (31) comprises a sleeve part and a rotating shaft center, the sleeve part is disposed on the locking deflector rod (8b), the rotating shaft center is disposed on the second support (64), the sleeve part is sleeved outside the rotating shaft center, and the locking deflector rod (8b) is capable of rotating rotate around the rotating shaft center through the sleeve part.

23. The leakage protector according to claim 1, wherein the leakage protector further comprises a pressing top block (35), the pressing top block (35) is provided on the locking deflector rod (8b), and the pressing top block (35) is positioned at one side of the latch (33); and when the power source is switched on, the second iron core (72) drives the elastic sheet pressing block (8a) to rotate by the vertical fork groove (23), the hasp (24) slides upward along the hasp slide way (36), and the hasp (24) instantly abuts against the pressing top block (35) after sliding through the latch (33), so that the movable pressing plate (34) moves downward to be adsorbed and fixed by the first iron core (62).

24. The leakage protector according to claim 1, wherein the leakage protector comprises an indicating block (42) provided on the pressing block upper part (8c) and the pressing block lower part (8d) are provided with spring grooves in positions corresponding to pressing block springs (9), the locking device (8) comprises spring pillars disposed in the spring grooves, and the spring grooves and the spring pillars are configured to install the pressing block springs (9).

25. The leakage protector according to claim 1, wherein the leakage protector further comprises an indicating block (42) provided on the locking deflector rod (8b), and the indicating block (42) is positioned at an upper part of the locking deflector rod (8b); when the power source is switched on, the indicating block (42) moves into an observation window (15) of a protector housing (1); when the power source is switched off, the indicating block (42) is removed from the observation window (15) of the protector housing (1); and the indicating block (42) is red.

26. The leakage protector according to claim 1, wherein the leakage protector comprises a limiting baffle (11) provided on the locking deflector rod (8b), and the limiting baffle (11) is disposed at an end of the locking deflector rod (8b) and is positioned at an upper part of the second support (64); and when the power source is switched off, the limiting baffle (11) abuts against the second support (64) so as to limit a rotation angle of the locking deflector rod (8b).

27. The leakage protector according to claim 1, wherein the elastic sheet (5) comprise a first elastic sheet (52) and a second elastic sheet (53), and the first elastic sheet (52) and the second elastic sheet (53) are fixed by the elastic sheet slots (55) disposed at two sides of the communication maintaining device (6) respectively;

tops of the pins (3) are provided with electrical connection contacts (16), and ends of the first elastic sheet (52) and the second elastic sheet (53) are provided with elastic sheet contacts (51) corresponding to the electrical connection contacts (16); when the pressing rod (22) presses the elastic sheet (5) downward, the elastic sheet contacts (51) are in contact with the electrical connection contacts (16); and in a using process, each of the elastic sheet contacts (51) on the first elastic sheet (52) and the second elastic sheet (53) is provided with a disconnected state for disconnecting from the electrical connection contact (16) a connected state for connecting with the electrical connection contact (16), and a PE wire can not be disconnected and is maintained in a connected state.

28. A leakage protector, comprising: a protector device (2), pins (3), a bottom plate (4) and a elastic sheet (5), wherein the protector device (2) is disposed at an upper part of the bottom plate (4), the protector device (2) controls switching-off and switching-on of the leakage protector, and the pins (3) are disposed at a lower part of the bottom plate (4);

the protector device (2) comprises a communication maintaining device (6), a communication device (7) and a locking device (8), and the locking device (8) is disposed between the communication maintaining device (6) and the communication device (7) and is configured to control disconnection and connection of the elastic sheet (5) and the pins (3);

the locking device (8) comprises an elastic sheet pressing block (8a) and a locking deflector rod (8b), the locking deflector rod (8b) is movably hinged with a second support (64) disposed on the communication device (7) by a second pin shaft (31), and the elastic sheet pressing block (8a) is movably hinged with a first support (43) disposed in the middle position of the bottom plate (4) by a first pin shaft (21); wherein the locking device (8) comprises a latch (33), a movable pressing plate (34) and a hasp slide way (36), the latch (33), the movable pressing plate (34) and the hasp slide way (36) is provided on the locking deflector rod (8b)

and a pressing block upper part (8c) and a pressing block lower part (8d), the locking device (8) comprises a hasp (24), a vertical fork groove (23) provided on the pressing block upper part (8c), a pressing rod (22) provided on the pressing block lower part (8d) and a pressing block spring (9), the pressing block upper part (8c) is hinged with the pressing block lower part (8d) by a first pin shaft (21), and the pressing block spring (9) in a compressed state is disposed between the pressing block upper part (8c) and the pressing block lower part (8d); when the pressing rod (22) abuts against the elastic sheet (5), an elasticity of the pressing block spring (9) enables the pressing rod (22) to maintain a stable action force against the elastic sheet (5), and the hasp (24) is configured to abut against the latch (33);

the communication device (7) comprises a second iron core (72) extending transversely, and the second iron core (72) is in clamping fit with the vertical fork groove (23); the communication maintaining device (6) comprises a first iron core (62) disposed longitudinally, and the first iron core (62) is configured to be in magnetic adsorption fit with the movable pressing plate (34);

when a power source is switched on, the second iron core (72) drives the elastic sheet pressing block (8a) to rotate by the vertical fork groove (23), so that the pressing rod (22) positioned at a bottom of the elastic sheet pressing block (8a) presses the elastic sheet (5) downward, and meanwhile, the hasp (24) slides upward along the hasp slide way (36); furthermore, in a process that the hasp (24) slides to abut against the latch (33), the movable pressing plate (34) continuously moves downward, and the movable pressing plate (34) is adsorbed and fixed by the first iron core (62); the communication maintaining device (6) is configured to fix a position of the locking deflector rod (8b) to enable the elastic sheet pressing block (8a) to be maintained in a pressed state and enable the elastic sheet (5) and the pins (3) to be maintained in a connected state, thereby realizing circuit switching-on; and when the power source is switched off, the communication maintaining device (6) stops working, the locking deflector rod (8b) is released, and the latch (33) is disengaged from the hasp (24) to enable the elastic sheet (5) to be disconnected from the pins (3), thereby realizing circuit switching-off.

\* \* \* \* \*